(12) United States Patent
Aboujassoum et al.

(10) Patent No.: US 10,617,253 B2
(45) Date of Patent: Apr. 14, 2020

(54) SYSTEM AND METHOD FOR AN AUTOMATIC COOKING DEVICE

(71) Applicant: Else Labs Inc., Berkeley, CA (US)

(72) Inventors: Khalid Aboujassoum, Doha (QA); Tariq Maksoud, Gloucesterq (CA); Adam Leonards, Concord, CA (US)

(73) Assignee: Else Labs Inc., Berkeley, CA (US)

( * ) Notice: Subject to any disclaimer, the term of this patent is extended or adjusted under 35 U.S.C. 154(b) by 602 days.

(21) Appl. No.: 15/149,156

(22) Filed: May 8, 2016

(65) Prior Publication Data

US 2016/0324359 A1  Nov. 10, 2016

Related U.S. Application Data

(60) Provisional application No. 62/159,009, filed on May 8, 2015.

(51) Int. Cl.
*A47J 27/12* (2006.01)
*A47J 27/00* (2006.01)
(Continued)

(52) U.S. Cl.
CPC .............. *A47J 27/12* (2013.01); *A23L 5/15* (2016.08); *A47J 27/004* (2013.01); *A47J 27/08* (2013.01); *A47J 36/00* (2013.01); *A47J 36/06* (2013.01); *A47J 36/321* (2018.08); *A47J 43/046* (2013.01); *A47J 43/06* (2013.01); *A47J 43/0716* (2013.01); *A47J 2043/0733* (2013.01)

(58) Field of Classification Search
CPC ... A23L 5/15; A47J 2043/0733; A47J 27/004; A47J 27/08; A47J 27/12; A47J 36/00; A47J 36/06; A47J 36/32; A47J 43/046; A47J 43/06; A47J 43/0716
USPC ........... 99/277, 325, 348; 426/231–233, 519, 426/438, 520, 523; 219/490–492, 442, 219/494, 400, 620; 222/168, 323, 330, 222/429; 700/211, 299
See application file for complete search history.

(56) References Cited

U.S. PATENT DOCUMENTS 4,649,810 A * 3/1987 Wong ...................... A47J 27/14
99/326
5,048,719 A   9/1991 Empl et al.
(Continued)

FOREIGN PATENT DOCUMENTS

EP   2429352 B1   8/2018
GB   2466336 A    6/2010
(Continued)

*Primary Examiner* — Tu B Hoang
*Assistant Examiner* — Vy T Nguyen
(74) *Attorney, Agent, or Firm* — Alpine Patents LLC; Brian Van Osdol

(57) ABSTRACT

A system and method for an automated cooking device that includes a multi-ingredient dispenser with a base, liquid dispenser and a dispensing selector, wherein the base comprises a set of base receptacles; a set of ingredient dispenser units that removably couple with the base receptacles and controllably open when in an engaged mode with the dispensing selector of the multi-ingredient dispenser; a cooking apparatus with a heating unit and mixing unit; and a control unit that is configured to process a multi-stage cooking process and that at least partially controls the dispensing selector, heating unit, mixing unit, and liquid dispenser.

14 Claims, 26 Drawing Sheets

(51) Int. Cl.
   *A47J 43/07* (2006.01)
   *A47J 43/06* (2006.01)
   *A47J 36/06* (2006.01)
   *A47J 36/00* (2006.01)
   *A47J 27/08* (2006.01)
   *A47J 43/046* (2006.01)
   *A23L 5/10* (2016.01)
   *A47J 36/32* (2006.01)

(56) References Cited

U.S. PATENT DOCUMENTS

| | | | |
|---|---|---|---|
| 5,474,211 A * | 12/1995 | Hellenberg | B01F 13/1058 |
| | | | 141/104 |
| 5,562,183 A * | 10/1996 | Naramura | A21C 9/04 |
| | | | 186/49 |
| 5,819,636 A | 10/1998 | Khashoggi | |
| 5,881,632 A | 3/1999 | Fadoul | |
| 6,032,571 A * | 3/2000 | Brous | C12C 13/10 |
| | | | 366/249 |
| 6,843,166 B1 * | 1/2005 | Li | A47J 27/14 |
| | | | 99/327 |
| 8,816,828 B2 | 8/2014 | Ebrom et al. | |
| 10,064,521 B1 * | 9/2018 | Gawali | B65D 83/00 |
| 2003/0046188 A1 | 3/2003 | Orozco | |
| 2004/0172380 A1 | 9/2004 | Zhang et al. | |
| 2004/0173103 A1 | 9/2004 | Won | |
| 2005/0193901 A1 | 9/2005 | Buehler | |
| 2008/0143550 A1 | 6/2008 | Ebrom et al. | |
| 2008/0222553 A1 | 9/2008 | Benjamin-Lambert | |
| 2009/0258332 A1 | 10/2009 | Mai et al. | |
| 2011/0300270 A1 | 12/2011 | Koppens | |
| 2013/0171304 A1 | 7/2013 | Huntley | |
| 2014/0377417 A1 * | 12/2014 | Martinez | A47J 36/321 |
| | | | 426/231 |
| 2015/0298081 A1 * | 10/2015 | McMath | C12C 13/10 |
| | | | 222/638 |
| 2016/0081515 A1 | 3/2016 | Aboujassoum et al. | |
| 2016/0198883 A1 * | 7/2016 | Wang | A47J 27/08 |
| | | | 426/231 |

FOREIGN PATENT DOCUMENTS

| | | |
|---|---|---|
| WO | 2014201509 A3 | 2/2015 |
| WO | 2015075730 A2 | 5/2015 |

* cited by examiner

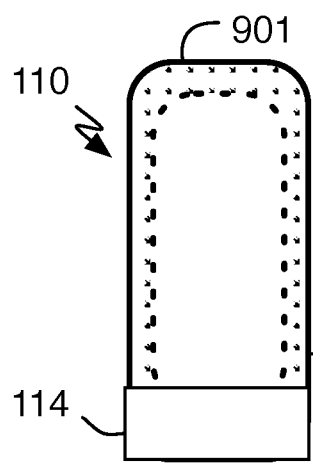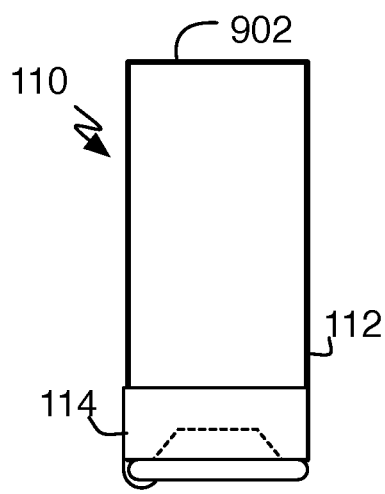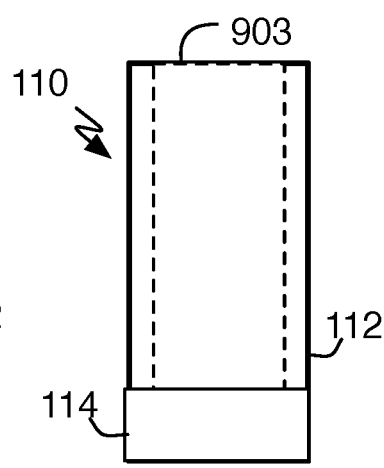
FIGURE 9A FIGURE 9B FIGURE 9C
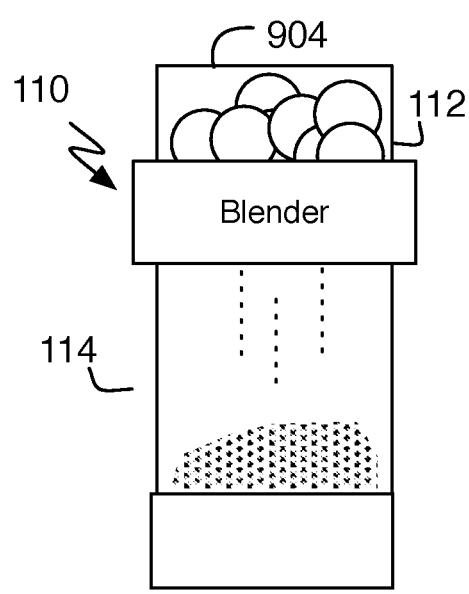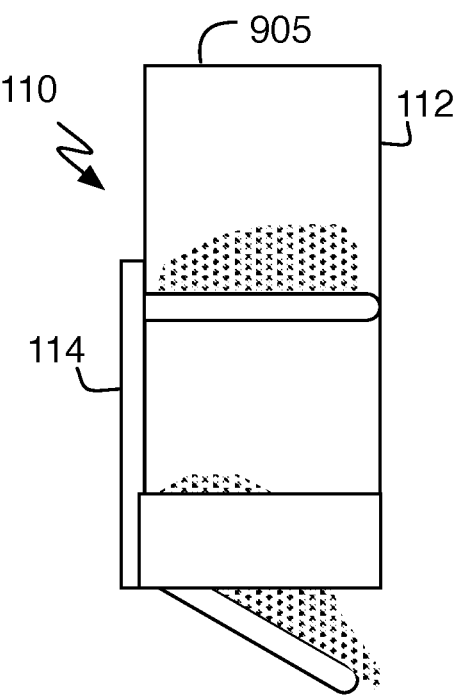
FIGURE 9D FIGURE 9E

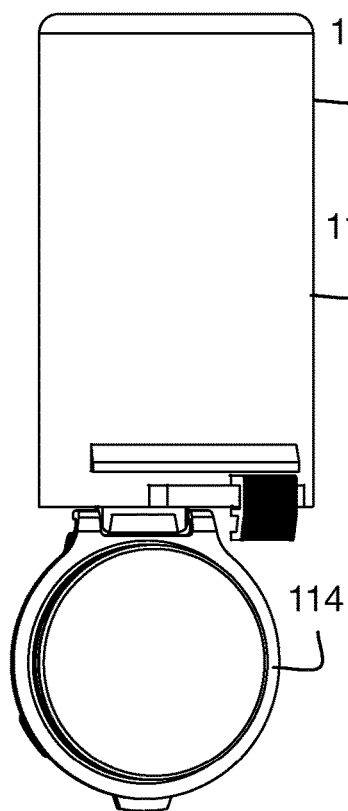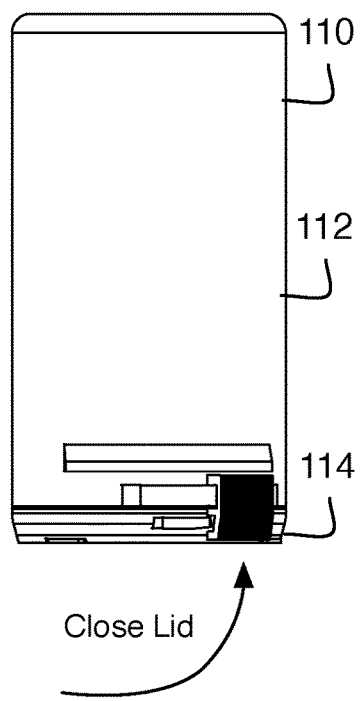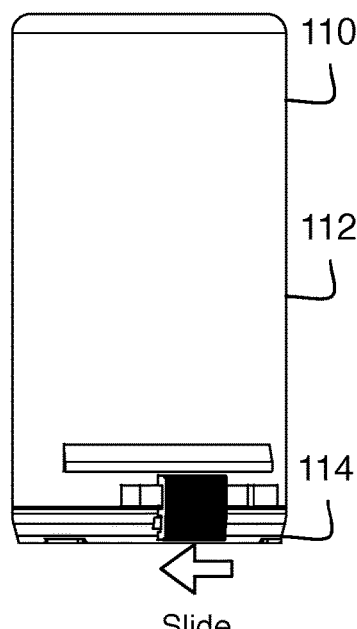
FIGURE 13A
FIGURE 13B
FIGURE 13C

SYSTEM AND METHOD FOR AN AUTOMATIC COOKING DEVICE

CROSS-REFERENCE TO RELATED APPLICATIONS

This Application claims the benefit of U.S. Provisional Application No. 62/159,009, filed on 8 May 2015, which is incorporated in its entirety by this reference.

TECHNICAL FIELD

This invention relates generally to the field of cooking devices, and more specifically to a new and useful system and method for an automatic cooking device.

BACKGROUND

In today's busy lifestyle, individuals and families have little time to prepare home cooked meals. There have been business and technological developments to address this problem such as meal and food delivery. However, meal delivery limits your options and can be as expensive or even more expensive than eating at a restaurant. Food delivery can simplify the shopping process but does not save a user from preparing a meal. There are some cooking devices that can simplify the meal preparation process such as a slow cooker. However, because a slow cooker is designed to cook only one group of ingredients over a long duration, the number and variety of dishes is limited. Current cooking tools lack a simple solution for using fresh ingredients to make complex multi-step recipes. Thus, there is a need in the cooking device field to create a new and useful system and method for an automatic cooking device. This invention provides such a new and useful system and method.

BRIEF DESCRIPTION OF THE FIGURES

FIGS. 9A-9E are schematic representations of exemplary types of ingredient dispenser units;

FIGS. 13A-13C are detailed schematic representations a usage of a slidable latch on a second variation of an ingredient dispenser unit;

DESCRIPTION OF THE EMBODIMENTS

The following description of the embodiments of the invention is not intended to limit the invention to these embodiments but rather to enable a person skilled in the art to make and use this invention.

1. System for an Automatic Cooking Device

Figure 1:
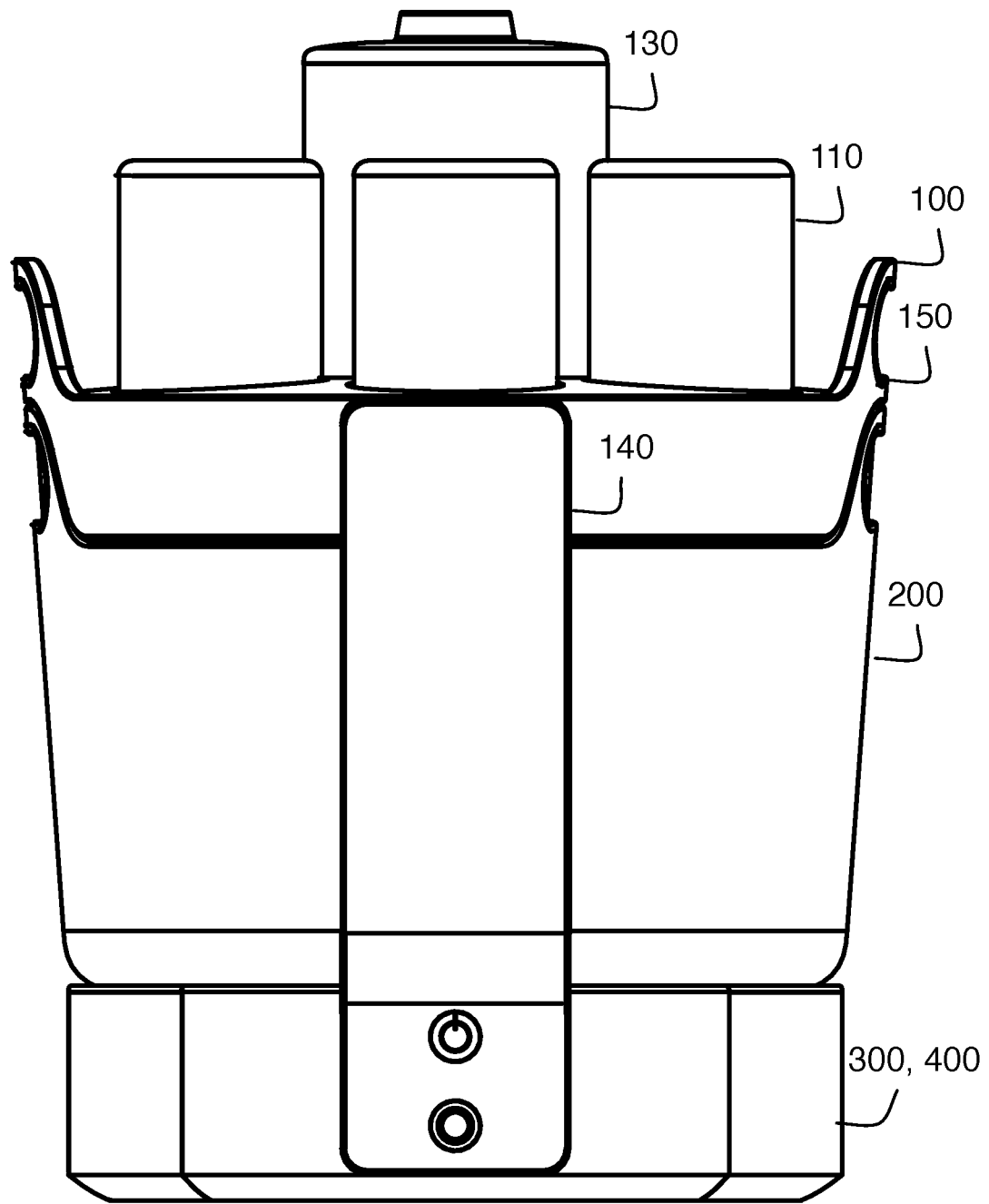
FIGS. 1 and 2 are a schematic representation of a system of a preferred embodiment.
Figure 2:
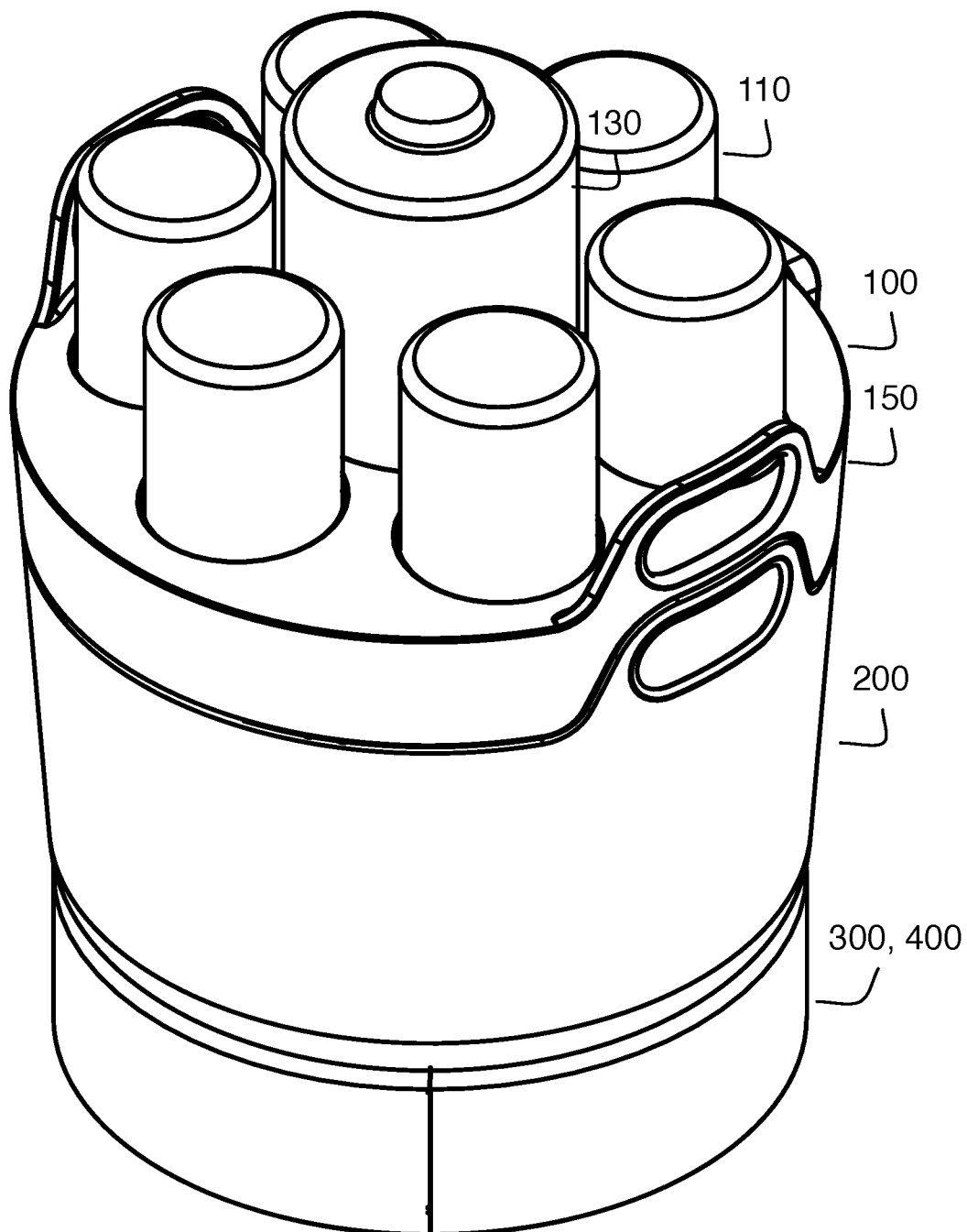
Figure 3:
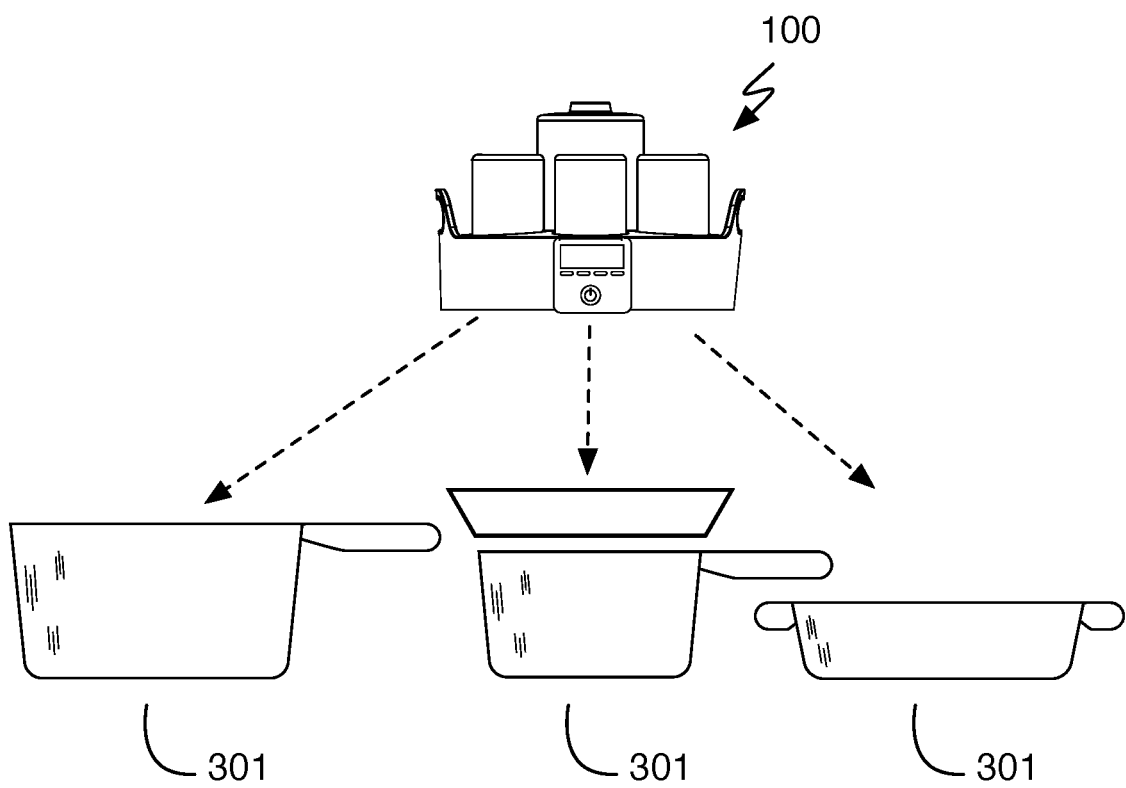
FIG. 3 is a schematic representation of a multi-ingredient dispenser system compatible with traditional cooking vessels.
Figure 4:
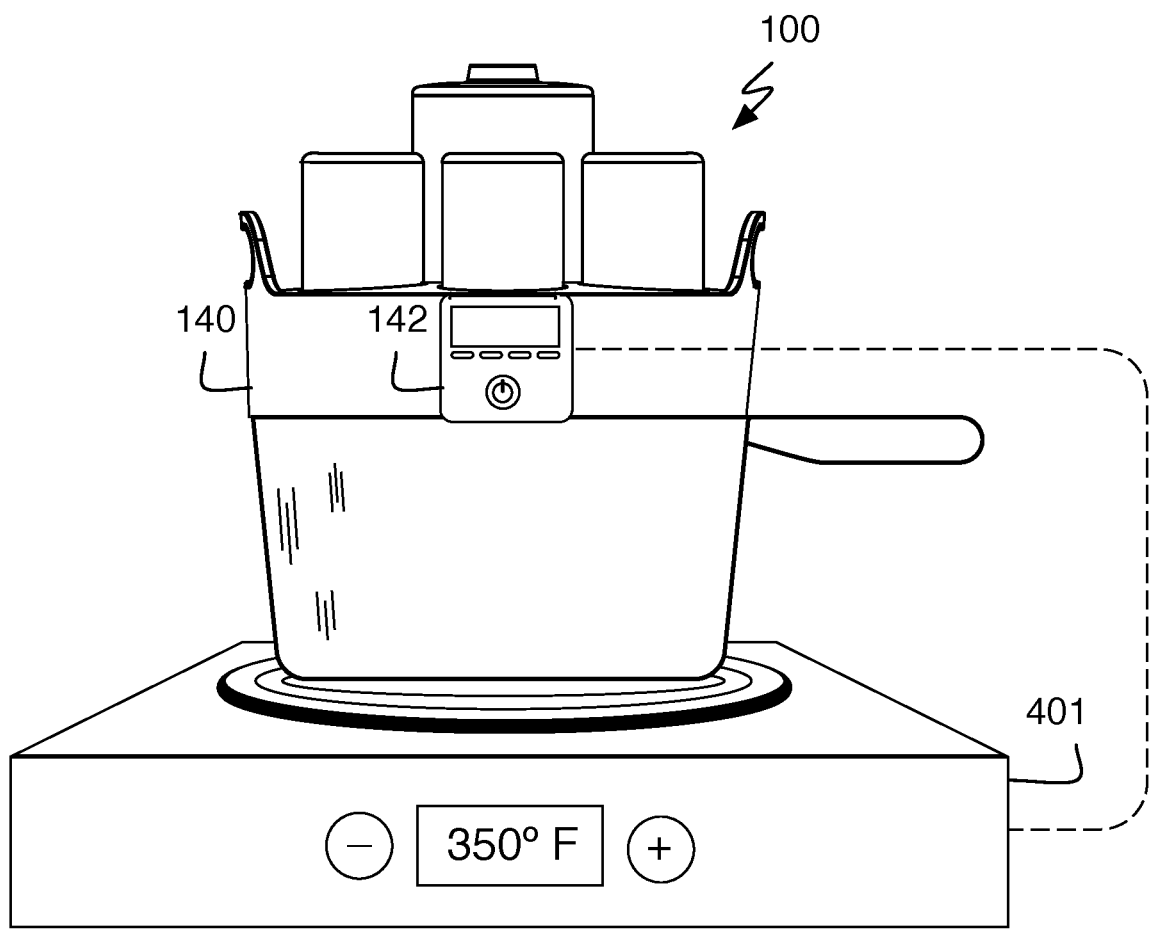
FIG. 4 is a schematic representation of a system interfacing with a smart stove.

As shown in FIGS. 1 and 2, a system for an automatic cooking device can include a multi-ingredient dispenser 100 with a base connectable to a cooking apparatus, a set of ingredient dispenser units 110 controllable by a dispensing selector 120, a liquid dispenser 130, and a control unit 140. The automatic cooking device can function to automate the cooking process through delivering ingredients to a cooking apparatus at different stages of the cooking process. The system can preferably automate the cooking process such that adding ingredients; mixing, heating, and/or other aspects of the cooking process may be controlled through a convenient device. The system can additionally include the cooking apparatus as shown in FIGS. 1 and 2, which may include a cooking vessel 200, a heating unit 300, and/or a mixing unit 400, which functions to offer a single product for completing a cooked dish. Alternatively, the system can comprise primarily the multi-ingredient dispenser 100, which may be used with traditional cooking apparatuses or even interchangeably used with a variety of traditional cooking pots 301 as shown in FIG. 3. In another alternative embodiment, the system can include the multi-ingredient dispenser 100 and a communication control interface 142 to a remote heat control system 401 such as a smart stove as shown in FIG. 4. A preferred configuration of the multi-ingredient dispenser 100 and the cooking apparatus is a vertically stacked and horizontally aligned configuration.

As a first objective, the stacked and aligned configuration of the system functions to leverage gravity as a driving force in the ingredient delivery process of the multi-ingredient dispenser 100. Preferably, an ingredient dispenser when activated by a dispensing selector 120 transitions from a closed state to an open state, and a dispensing gate 114 opens. The ingredients preferably fall into the cooking apparatus when the dispensing gate 114 is open. Accordingly, the multi-ingredient dispenser includes a base that is removably connectable to a cooking apparatus so that the multi-ingredient dispenser is vertically positioned at least partially above the cooking vessel (e.g., the cooking surface). As a second objective, the stacked and aligned configuration functions to reduce mechanism complexity so as to reduce the system space requirements. The ingredient dispenser units 110 can be stationary when positioned in the multi-ingredient dispenser 100. As opposed to translating the ingredient dispenser units 110 so that ingredients can be added, the ingredient dispenser units 110 can be fixed and then activated in place when ingredients should be added. In one implementation, the system can fit on a counter utilizing counter surface real estate substantially equivalent to the cooking vessel 200, and the system can additionally be limited to a vertical height so as to stand between the counter and an overhead cabinet. Additionally, the size and form of the components can be conducive to make the parts amenable to normal dish care and usage. For example, ingredient containers 112 of the ingredient dispenser unit 110 can be a shaped and sized in addition to being made of compatible materials such that the ingredient containers 112 can be stored in the refrigerator or washed in a dishwasher. Furthermore, the cooking apparatus may be similar in form to a traditional cooking vessel and in some embodiments can be traditional cooking vessel. The familiarity and approachability of the system can facilitate increased comfort and ease of use by users.

As another objective, the system functions to simplify the cooking process for a user while offering a wide variety of possible dishes. The system preferably performs staged ingredient delivery. Numerous cooking recipes depend on adding sets of ingredients at different stages of the cooking process. The multi-ingredient dispenser includes multiple ingredient dispenser units 110 to accommodate these different stages of a recipe. The ingredients for these different stages of ingredients can be prepared by a user, which may include preparation such as cutting, slicing, mixing, and/or other preparation processes. User prepared ingredients opens up the possibilities of user-selected ingredients. A user can use fresh organic produce or customize the ingredient balance if, for example, the user likes more or less of a particular flavor or ingredient. User prepared ingredients additionally supports customization and creation of new recipes. A user may swap ingredients within a recipe or a cooking process for the system may be created from scratch to form a new recipe for the system. The system can additionally accommodate pre-packaged ingredient packs to further simplify the cooking process. In one variation, pre-packaged ingredient packs may be easily added to an ingredient container 112. In another variation, pre-packaged ingredient packs may be distributed as ingredient containers 112 that can be directly used with the system. In either case, the use of the system can include the user adding the ingredients to the multi-ingredient dispenser 100, and then the ingredients and/or liquids are added to the cooking apparatus at different recipe stages. The system can be pre-loaded with ingredients and then initiated to start the cooking process or set to start the cooking process at a particular time/event or in order to deliver a meal at a particular time.

The system is preferably applied to stovetop cooking but may alternatively be used for stir-frying, stewing, steaming, slow cooking, pressure-cooking, and other suitable forms of cooking. In one variation, the multi-ingredient dispenser 100 can be modular so as to be used with multiple varieties of cooking apparatuses. In another variation, the multi-ingredient dispenser 100 and the cooking apparatuses can be specifically designed for use as a single system. In yet another variation, the system can include a set of different cooking apparatuses and components such that they can be used interchangeably or together. For example, one embodiment of the system may include a multi-ingredient dispenser 100 that can be used with a stovetop cooking apparatus or a stir-frying apparatus.

2. Multi-Ingredient Dispenser

The multi-ingredient dispenser 100 functions to deliver ingredients in multiple stages. The multi-ingredient dispenser 100 can deliver multiple stages of ingredient groups through selectively engaging different ingredient dispenser units 110. These ingredients are preferably delivered by controllably opening a bottom door of an ingredient dispenser unit 110 so that the contained ingredients fall into the cooking apparatus. The multi-ingredient dispenser 100 can additionally deliver liquid such as water, meat or vegetable stock, oil, and/or any suitable form of liquid. The multi-ingredient dispenser 100 can include a dispenser base 150, at least one liquid dispenser 130, a set of ingredient dispenser units 110, a dispensing selector 120, and a control unit 140. The liquid dispenser 130 and the set of ingredient dispenser units 110 can include removable components to facilitating loading of ingredients and liquids. During operation, the removable components can be coupled to the dispenser base 150.

In a preferred implementation, the multi-ingredient dispenser 100 is a device with a dispensing face and a food and liquid container loading side. The dispensing face preferably covers the cooking apparatus during use, and the liquids and ingredients are dispensed from the multi-ingredient dispenser 100 at the dispensing face.

Figure 24:
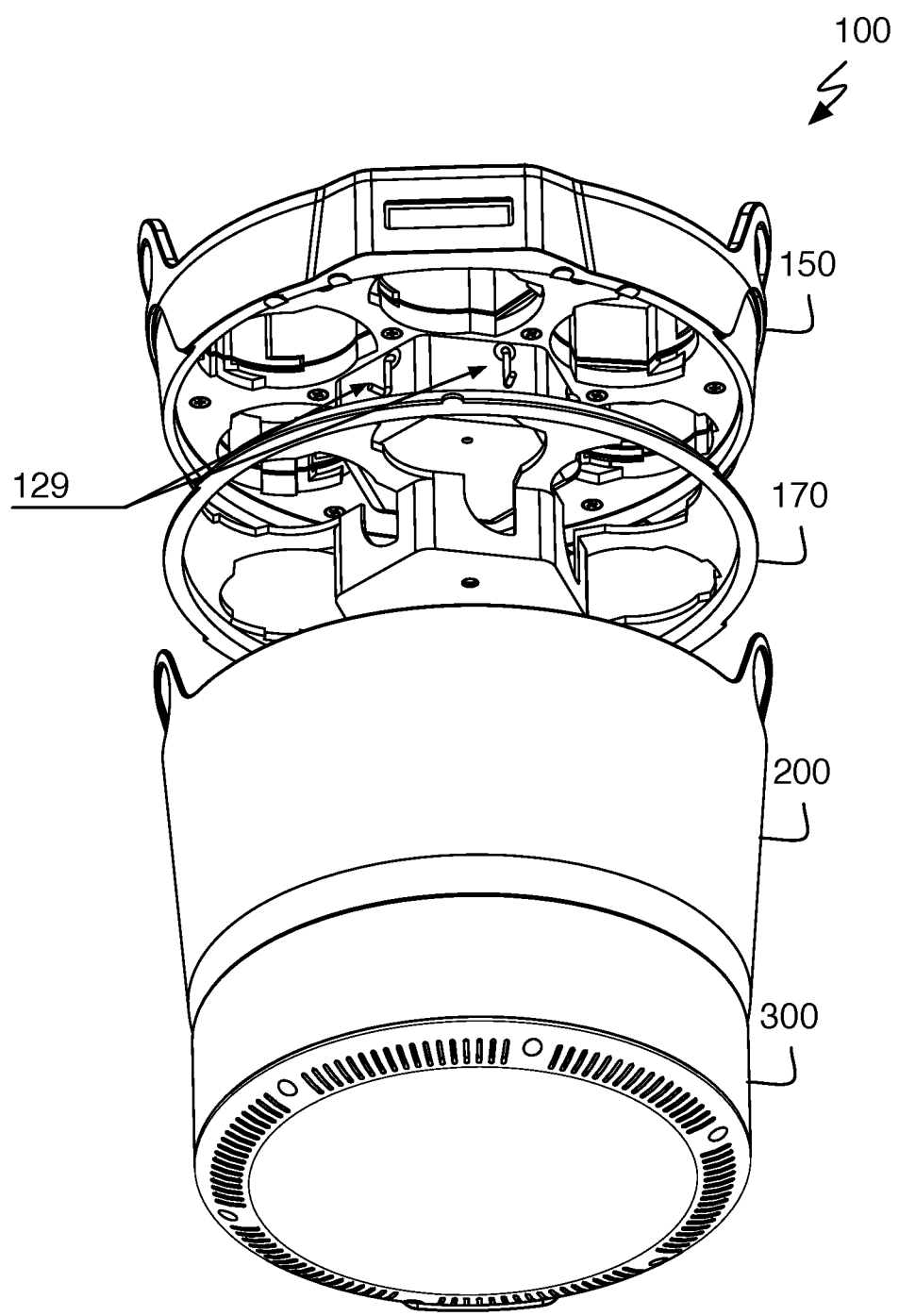
FIG. 24 is an exploded view representation of a system variation including a dispensing face cover.

In one variation, the multi-ingredient dispenser 100 can include a dispensing face cover 170 as shown in FIG. 24, which functions to shield at least portions of the multi-ingredient dispenser 100 from cooking debris coming up from the cooking apparatus. A dispensing face cover 170 is preferably a physical component that can removably attach to the dispensing face of the multi-ingredient dispenser 100. Alternatively, the dispensing face cover 170 may physically couple with a cooking apparatus in addition to or as an alternative to attaching to the multi-ingredient dispenser 100. The dispensing face cover 170 can include defined openings to allow ingredients and/or liquids to be dispensed into the cooking apparatus. In one implementation, the dispensing face cover 170 includes defined openings for each base receptacle configured for the ingredient dispensing units 110 and one for the liquid dispenser 130. The dispensing face cover 170 is preferably made of machine washable material.

The multi-ingredient dispenser 100 and the associated components can be constructed from materials with heat-resistant properties. The multi-ingredient dispenser 100 can include handles so as to be placed on top of a cooking apparatus or removed from a cooking apparatus. The multi-ingredient dispenser 100 is preferably designed to be positioned above the cooking apparatus and centered over the bottom face of the cooking apparatus. Preferably, the bottom face of the cooking apparatus and the plane of the dispensing face are substantially parallel when engaged.

The multi-ingredient dispenser 100 preferably engages with a cooking apparatus so that the dispensing ports of the dispensing face are positioned over the cooking apparatus. More preferably, the multi-ingredient dispenser 100 is centrally positioned over the cooking apparatus. When engaged, the handles of the cooking apparatus could physically couple with a defined cavity that is configured to conform to the handles of the cooking apparatus as shown in FIG. 2. In an alternative embodiment, the multi-ingredient dispenser 100 could be positioned off center. In one variation, the dispensing selector 120 could be designed so that the ingredient dispenser units 110 rotate to be over the cooking apparatus and at a particular point are activated to dispense the contained ingredients.

The side perimeter of the multi-ingredient dispenser 100 can be substantially similar in shape to that of the bottom face of the cooking apparatus. For example, the perimeter of the multi-ingredient dispenser 100 can be circular, oval, rectangular with or without rounded corners, or any suitable shape. In one variation, the multi-ingredient dispenser 110 and the cooking apparatus stack in a nesting arrangement, wherein the multi-ingredient dispenser 100 sits on a seat defined around the perimeter of the cooking apparatus. The multi-ingredient dispenser 110 can alternatively include any suitable coupling mechanism to attach or be positioned above a cooking apparatus. The multi-ingredient dispenser 100 may alternatively be positioned above a cooking apparatus in any suitable manner. For example, the multi-ingredient dispenser 100 can use a stand or attach to a supporting structure such as a wall.

The multi-ingredient dispenser 100 can be designed to accommodate one specific type of cooking apparatus, or alternatively, the multi-ingredient dispenser 100 can include a set of coupling mechanisms to accommodate different sizes, different and/or any suitable variety of cooking vessels. In one variation, the system can include various attachment adaptors, which may be used to enable the multi-ingredient dispenser 100 to accommodate small pots and large pots, cooking apparatuses with circular openings or oval openings, and/or cooking apparatuses with different profiles.

2.1 Dispenser Base

The dispenser base 150 functions to mechanically couple to the cooking container and to mechanically couple with the water dispenser and the set of ingredient dispenser units 110. The dispenser base 150 additionally functions to removably couple to the cooking apparatus. The dispenser base 150 is preferably a rigid structure or chassis that can be set on top of a cooking apparatus and that can receive one or more liquid dispenser 130 or ingredient dispenser units 110.

Figure 5:
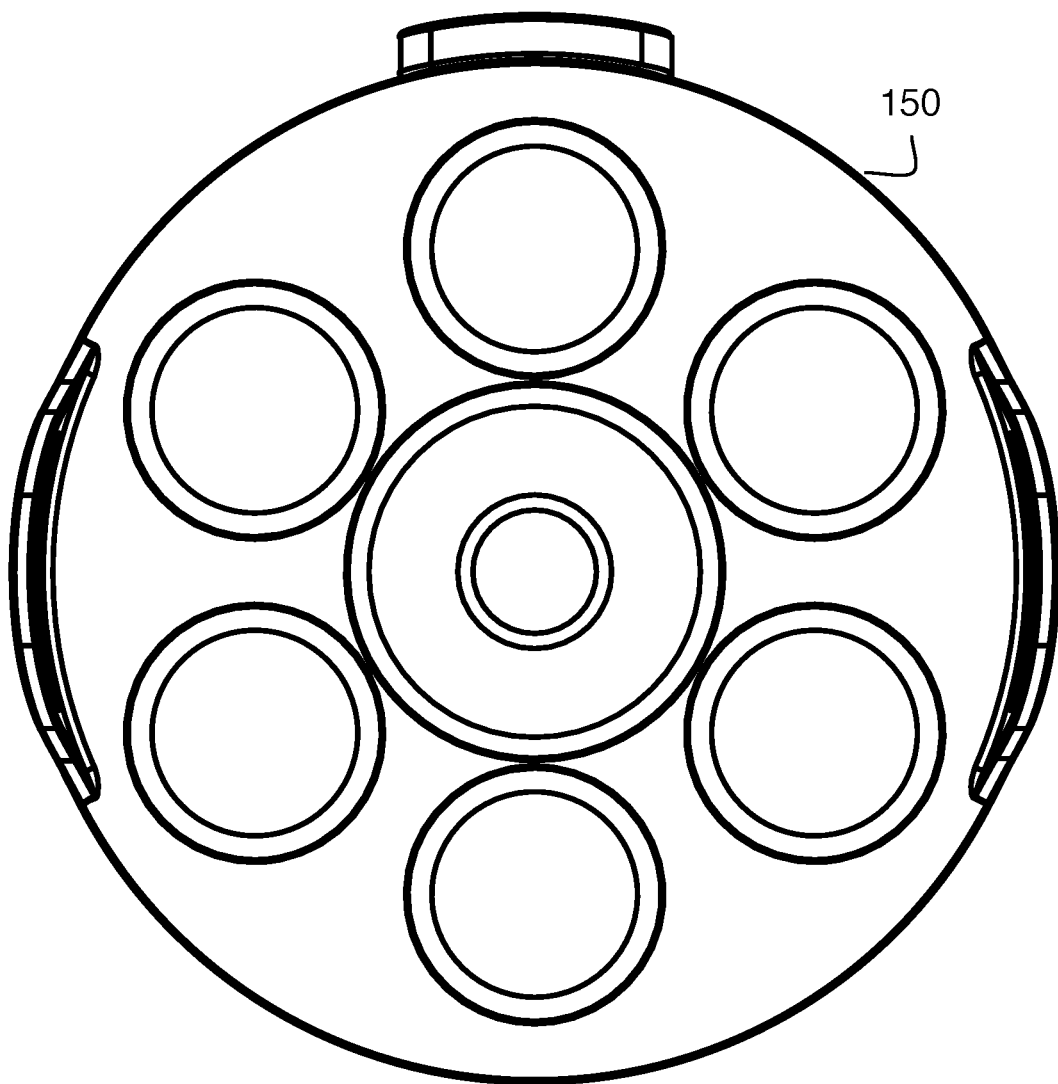
FIG. 5 is a top view of the dispenser base.

The dispenser base 150 can be a housing for various components that make up in part of the liquid dispenser 130, one or more of the ingredient dispenser units 110, the dispensing selector 120, and the controller unit 140. In a preferred variation, the containers of the liquid dispenser 130, and the ingredient dispenser units 110 are configured to be removed from the dispenser base 150 so as to be easily filled with the ingredients for a recipe. The dispenser base 150 preferably includes a set of base receptacles, which are defined cavities. The dispenser base 150 can include a first defined cavity and coupling mechanism acting as a base receptacle for the liquid dispenser 130, and the dispenser base 150 can include a set of additional defined cavities and coupling mechanisms acting as base receptacles for the set of ingredient dispenser units 110. In one variation, the cavity of the liquid dispenser 130 is centrally located, and the set of additional cavities are distributed in a ring-like pattern around the first cavity as shown in FIG. 5. The base receptacles for the ingredient dispenser units 110 can be arranged in any suitable pattern.

Figure 6:
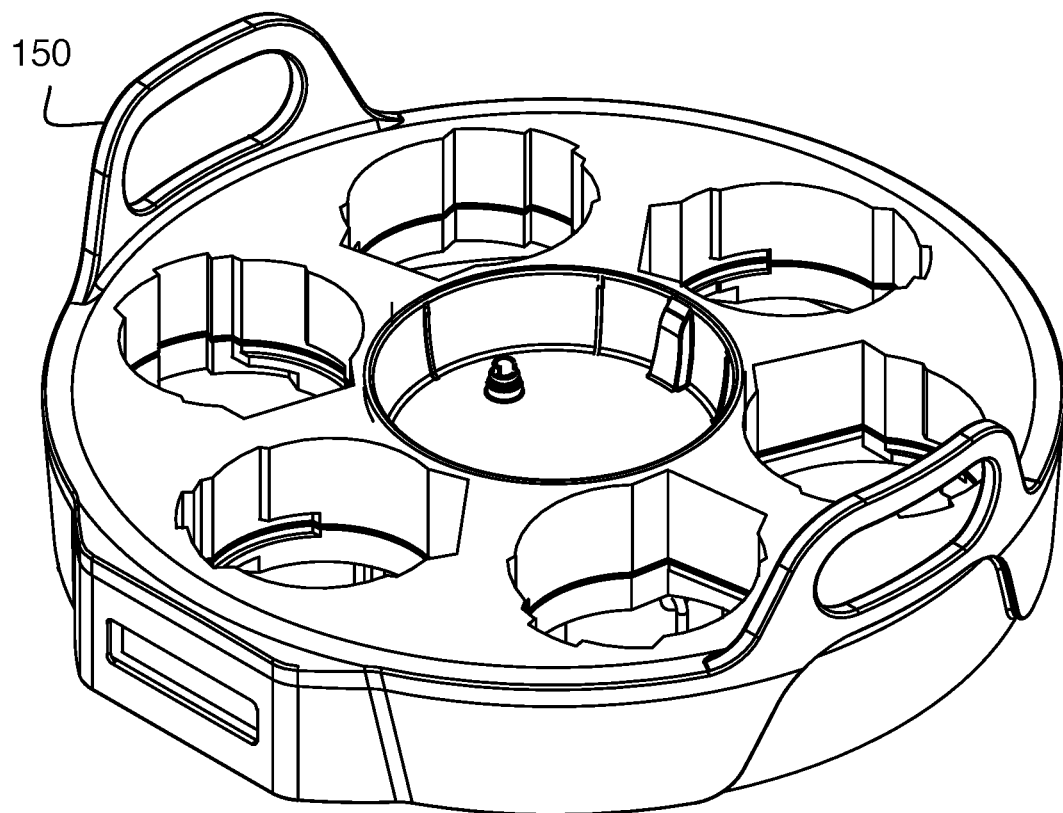
FIG. 6 is a schematic representation of a cavity in the dispenser base with an indexing tab.

A recessed cavity of a base receptacle for the liquid dispenser 130 or one of the ingredient dispenser units 110 can define a substantially cylindrical space or any suitable shape to receive a container of the liquid dispenser 130. The coupling mechanism could be one portion of a threaded fastener, a latch, a spring-loaded pin, a magnet, or any suitable coupling mechanism. The cavity can additionally include physical indexing structures that guide a container so as to be inserted in one of a set of defined orientations in the cavity. The physical indexing structure could be a tab within the base receptacle as shown in FIG. 6. The tab can be a protrusion or groove that mates with a complimentary groove or protrusion of the inserted object. When inserting a component such as an ingredient container 112, the user may need to align the physical indexing structure(s) of the dispenser base 150 to a complimentary physical indexing structure of the ingredient container 112. In one embodiment, the physical indexing structure feature is applied to limit the possible positions of an ingredient container 112 to a single position that results in the ingredient dispenser unit 110 engaging an activating feature of the dispensing selector 120. In one implementation, a physical indexing structure could be a course guide, rail, screw, tab or other type of indexing structure that rotates or funnels an incoming component into a designated position when fully attached to the dispenser base 150. Additionally, the dispenser base 150 could include a sensor or switch that is configured to determine when a component is attached. The sensor may additionally identify the type of component attached. The multi-ingredient dispenser 100 or an alternative system component could include a digital indicator (e.g., an LED or indicator in an app) that shows when a component is inserted and locked.

2.2 Liquid Dispenser

The liquid dispenser 130 functions to dispense a liquid into the cooking apparatus. The liquid dispenser 130 is preferably used for dispensing water to the cooking apparatus. The liquid dispenser 130 may alternatively be used for dispensing meat or vegetable stock, oil, and/or any suitable form of liquid. The liquid dispenser 130 can include a liquid container. As water and/or other liquids can be a significant ingredient, the container may be sized to accommodate larger volumes when compared to the volume of the ingredient container 112 of the ingredient dispenser unit 110. The liquid container is preferably removable. A user can remove the liquid container and fill the liquid container with the desired liquid. Alternatively, the liquid container can be rigidly fixed to the multi-ingredient dispenser 100, wherein a user pours or adds liquid to the liquid container as the liquid container is attached. Some embodiments of the system may not use a dedicated liquid dispenser 130.

Additionally, the liquid dispenser 130 can include a controllable valve that can be opened and closed. Herein, a controllable valve is described as the dispensing mechanism, but the liquid dispenser 130 may alternatively use a pump or other suitable dispensing mechanism. The liquid container preferably includes a lid to allow liquids to be added to the container. The lid is preferably on the end opposite of the controllable valve. The lid and the valve may alternatively be integrated. In the rigidly fixed variation described above, the liquid container may alternatively be open at the side opposite the valve (e.g., the top portion).

The controllable valve can be any suitable type of valve used to control at least the initial delivery of the liquid. Preferably the controllable valve can open and close so that portions of the liquid container can be added at different stages and may be dynamically added (i.e., incrementally dispensed) based on the cooking conditions of the recipe. The control unit 140 can be communicatively coupled to the liquid dispenser 130 to control when the liquid dispenser 130 dispenses liquid.

As an alternative to a controllable valve, the liquid dispenser 130 may include an openable lid such that all the liquid may be added at an appropriate time. Similarly, the ingredient containers 112 of an ingredient dispenser unit 110 may be sealed such that they can hold liquid and add the liquid when activated.

Figure 7:
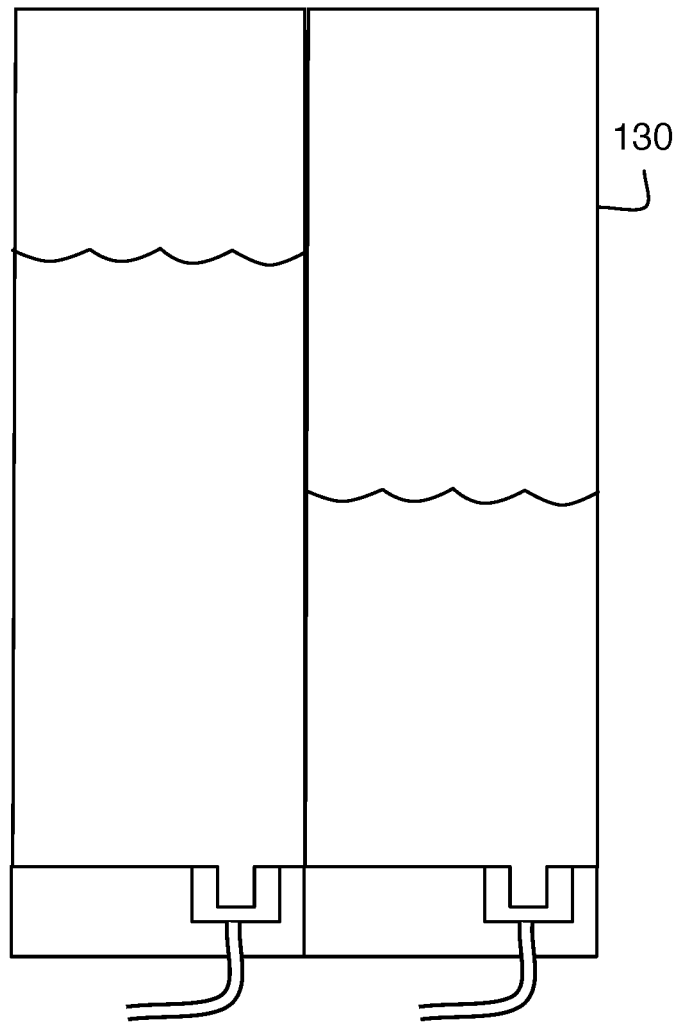
FIG. 7 is a schematic representation of a liquid dispenser with multiple subsystems.

In some embodiments the liquid dispenser 130 can include multiple subsystems that accommodate dispensing multiple types of liquids as shown in FIG. 7, wherein different liquids could be added independently. For example, a liquid dispenser 130 could include a first subsystem that could be dispense a first type of liquid (e.g., water) and a second subsystem that could dispense a second type of liquid (e.g., chicken broth). In some embodiments, a multi-ingredient dispenser 100 may not include a liquid dispenser.

The liquid dispenser 130 could additionally include a liquid heating element to heat the liquid prior to adding to the cooking apparatus. The liquid heating element could be controlled through the control unit 140. A temperature sensor could be used in coordination with the liquid heating element to regulate the liquid temperature.

The liquid dispenser 130 could additionally include a volume sensor to monitor the amount of liquid available in the liquid container and/or the amount of liquid added to the cooking apparatus. The liquid dispenser 130 may additionally include a liquid pump and/or a flow meter, which functions to monitor liquid being pumped from the liquid container.

2.3 Ingredient Dispenser Unit

The ingredient dispenser unit 110 functions as a temporary vessel to hold ingredients until the appropriate time in the cooking process and facilitates adding the cooking apparatus. An ingredient dispenser unit 110 can be removably coupled to the base receptacles of the dispenser base 150, wherein the ingredient dispenser unit 110 is temporarily attached at least during a cooking process. The ingredient dispenser unit 110 is in an engaged mode when attached to the dispenser base 150 and can be controllably opened when engaged. The dispensing selector 120 can activate a specified ingredient dispenser unit 110 which can cause the release of the held ingredients into the cooking apparatus. The ingredient dispenser unit 110 additionally functions to enable specific batches of ingredients to be dispensed into a cooking apparatus at a set time. An ingredient dispenser unit 110 can be in an open state or a closed state. Preferably, the open state of each of the set of ingredient dispenser units 110 is individually controlled by the dispensing selector 120 according to directives of a control unit 140. The ingredient dispenser unit 110 can be used to dispense solid ingredients, liquids, semi-solid food items, spices, and/or any combination of ingredient types. Alternative embodiments can include any suitable combination of ingredient dispenser units 110 and/or liquid dispensers 130. In one variation, all ingredient dispensers units 110 are identical wherein there is no distinct liquid dispenser.

Figure 8:
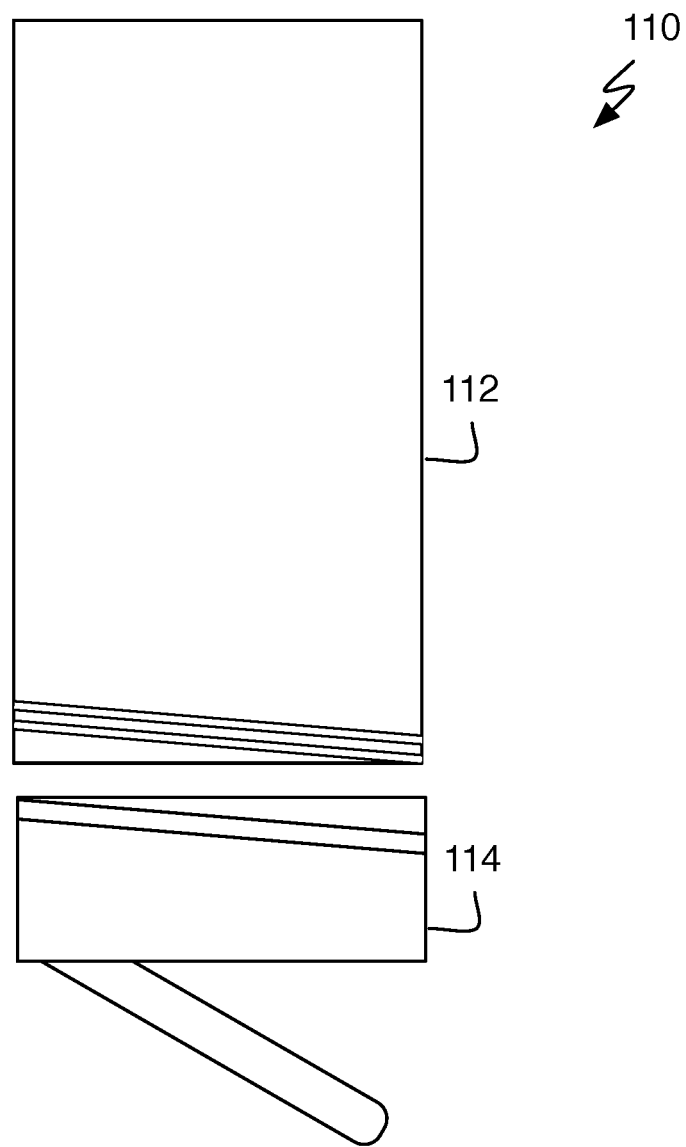
FIG. 8 is a schematic representation of first variation of an ingredient dispenser unit.

The ingredient dispenser unit 110 can include an ingredient container 112 portion and a dispensing gate 114 portion coupled to the ingredient container 112 as shown in FIG. 8. In one variation, the dispensing gate 114 portion can be removably coupled to the ingredient container 112.

Ingredient container 112 portion is preferably a cup like structure defining a substantially cylindrical cavity. The defined cavity for holding ingredients may alternatively include any suitable defined geometry. The ingredients are preferably loaded into the cavity to wait for dispensing into a cooking apparatus. The ingredient container 112 portion can be a solid structure made of any suitable material preferably a food grade plastic, glass, or metal.

The ingredient container 112 portion can be substantially identical for the set of ingredient dispenser units 110. Since at least the ingredient container 112 portion can be removed, there can be a variety of different types of ingredient containers 112. There can be a basic cup-like container, a funnel container, a non-stick container, an insulated container 901 as shown in exemplary FIG. 9A, a sealed container 902 as shown in exemplary FIG. 9B, an open-ended container 903 as shown in exemplary FIG. 9C, an active container 904 as shown in exemplary FIG. 9D, a multi-chamber container 905 as shown in exemplary FIG. 9E, and/or any suitable type of container. Additionally, any type of container may incorporate any suitable set of features of other types of containers. For example, a cup-like, insulated, non-stick container could be one variety of an ingredient container 112.

A cup-like container can function as a standard container. There can be multiple variations for supported ingredient volumes of a cup-like container.

A funnel container can function to dispense ingredients that are best delivered through a funnel such as a sauce.

A non-stick container can include a special coating along part or all of an internal surface of the ingredient container 112 such that ingredients do not stick to the container during dispensing. Non-stick coatings could be applied to any suitable type of container.

An insulated container as shown in FIG. 9A can function to thermally insulate contained ingredients from heat exchange. Cold ingredients and ingredients sensitive to heat may be kept in an insulated container to limit heating before being dispensed. Similarly, hot ingredients may be kept hot for a longer duration before being dispensed. The insulated container can use passive thermally insulating materials and wall formations to diminish heat exchange. Alternatively, the insulated container could include an active thermal regulating system to refrigerate and/or heat ingredients before dispensing. There can additionally be partially insulated containers. In one implementation, the dispensing gate 114 portion may be insulated to limit heat entering the container during the cooking processes.

A sealed container as shown in FIG. 9B functions to have a seal when closed. A sealed container could be used to hold liquids such that the liquid does not leak while held in the container. The ingredient dispenser unit 110 may be mostly held in two different orientations when filling the container with ingredients and when attaching to the dispenser base 150. A seal is preferably used where the ingredient container 112 and the dispensing gate 114 or some other lid portion interface. A sealed container may use a gasket, O-ring, or any suitable type of seal.

An open-ended container as shown in FIG. 9C functions to allow for ingredients to be added while the container is attached. An open-ended container could facilitate adding ingredients while the ingredient container is attached. For example, liquids could be poured into an attached ingredient container. Similarly, ingredients may be added while the system is cooking a dish. For example, with a one open-ended container, a user could have easy access to add spices to customize a dish. An open-ended container could additionally facilitate adding accommodating large or unusually shaped ingredients such as pasta.

An active container can function to perform some task on the ingredients. An active container could be designed for any suitable purpose such as heating, cutting, or mixing. A heating container could include a heating element that heats the ingredients either for cooking or for keeping the ingredients warm. A cutting container as shown in FIG. 9D could include a grating, dicing, or blending element so that ingredients could be prepped while being added to the container.

For example, a grating element on the end opposite of the dispensing gate 114 could enable cheese to be added directly to the container while grating the cheese, which would simplify required tools and reduce cleanup. Another active container could include a forced ingredient dispensing container, wherein the contents of the container can be forcibly dispensed. A forced ingredient container could be useful for ingredients that are thick and/or sticky and may not easily fall from an opened ingredient container 112. A forced ingredient dispensing container can include an agitator (e.g., a vibrating motor), a syringe, a pressurized air valve, an actuated scraper, and/or any suitable mechanism to force ingredients out of the ingredient container 112.

A multi-chamber container could include a mechanism where multiple ingredients could be kept separate while in the container as shown in FIG. 9E. The different chambers could be simultaneously opened when the dispensing selector 120 activates the dispensing gate 114 of the ingredient dispenser unit 110. Alternatively, each chamber may be individually controlled. The various chambers may be controlled through the dispensing selector 120, but may alternatively be controlled through another mechanism. In one example, a first defined chamber adjacent to the dispensing gate 114 can be controlled by the dispensing selector 120, while at least a second chamber may be controlled through a second dispensing mechanism. The second dispensing mechanism can be a valve, a gate, or any suitable component that selectively separates the first and second chamber.

The dispensing gate 114 portion functions as a door or valve with at least two states. A closed state allows the ingredients in an ingredient container 112 to be contained within the ingredient container 112, and an open state allows the ingredients held in the container portion to be added to the cooking apparatus. When the dispensing gate 114 is in an open gate, the ingredients preferably fall from the container portion into the cooking apparatus below. The ingredient dispenser unit 110 is preferably kept in a closed state until the controller unit 140 determines it is the appropriate time to add the ingredients held in the ingredient container 112. Since ingredients are often added in different stages, each ingredient dispenser unit 110 can hold a set of different ingredients that should be added as a group during the same stage of a recipe. Grouped ingredients can minimize the number of ingredient dispenser units 110. In some cases when at least two ingredients of the same stage would react with one another, two ingredient dispenser units 110 may be opened consecutively by the dispensing selector 120 with little time delay.

As mentioned, the dispensing gate 114 can have at least two states: opened and closed. In one variation, the dispensing selector 120 can be used to open or close a dispensing gate 114. In a preferred implementation, a series of ingredient dispenser units 110 are sequentially opened and then can be closed in a reverse sequential order. Alternative variations may only provide the option of opening a dispensing gate 114, wherein an ingredient dispenser unit 110 is reset to a closed state by a user prior to each use of the system. In yet another variation, an alternative ingredient selector 120 may activate the ingredient dispenser units 110 in non-sequential order (e.g., in any suitable order).

The dispensing gate 114 portion can utilize a variety of opening/closing mechanisms described below with the dispensing selector 120. In a first variation, the dispensing gate 114 portion includes a hinged door that can open and close. In another variation, a dual hinged door mechanism can be used. Additionally, the dispensing gate 114 can have a variable size valve wherein the rate of ingredients being added could be controlled. In some variations, the open state can be variable, wherein the degree to which the dispensing gate 114 is opened and/or the duration of the open state is proportional to the amount of ingredients added. The rate and quantity of added ingredients could be controlled using a variable dispensing gate 114. For example, controllable diaphragms, irises, and/or any suitable controllable opening may be used. The dispensing gate 114 preferably includes a coupling mechanism 116 that is configured to engage with part of the dispensing selector 120. The dispensing gate preferably includes a coupling mechanism 116 that physically couples with the dispensing selector 120. In a preferred implementation, the coupling mechanism 116 is a hook structure that engages with a pin 127 of the dispensing selector 120 and the pin 127 is part of a guided pin mechanism 126.

The dispensing gate 114 portion can additionally include additional elements such as sealing rings, insulation, and/or other components.

Additionally, the ingredient dispenser unit 110 can include an ingredient sensing system. The ingredient sensing system can be used to measure weight, volume, chemical makeup, temperature, and/or any suitable property. The ingredient sensing system can include a load cell to measure the weight of the ingredients in an ingredient container 112. The ingredient sensing system could additionally or alternatively include an optical volume sensor to detect the volume of ingredients loaded into an ingredient container 112.

Figure 10:
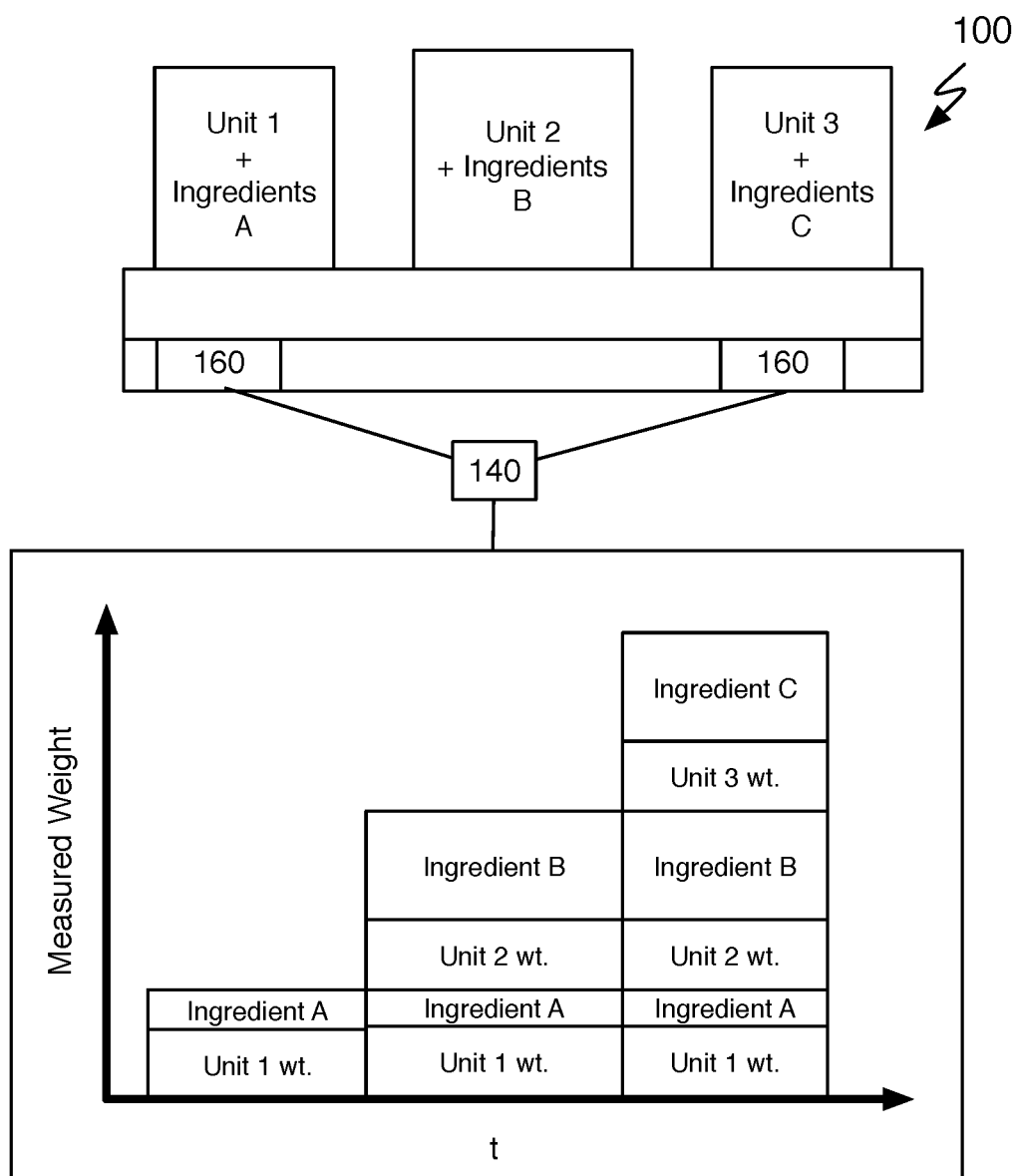
FIG. 10 is a schematic representation of a multi-ingredient dispenser with a load cell system.

Measuring the weight of ingredients in an ingredient dispenser unit 110 can be achieved in a variety of approaches. The multi-ingredient dispenser 100 preferably includes a load cell system 160. In one variation, a load cell of the load cell system 160 can be integrated into a base receptacle of the dispenser base 150. The load cell is preferably positioned such that the ingredient dispenser unit 110 applies the majority of its weight on a structure supported by the load cell so as to measure the weight of the ingredient dispenser unit 110 when inserted in the dispenser base 150. Such a load cell configuration could be used in each of the base receptacles. In another variation a load cell of the load cell system may be integrated into a lid portion of the dispensing gate 114 where ingredients would primarily rest within the ingredient dispenser unit 110. In an alternative implementation, a central load cell system 160 can measure the weight of ingredients as the individual ingredient dispenser units 110 are added to the system as shown in FIG. 10. The central load cell system 160 can be integrated into the dispensing base 150 or into some portion of an included cooking apparatus. The weight of each ingredient container 112 could be assessed by a central load cell system 160 as each ingredient container 112 is individually attached to the dispensing base 150. The central load cell system 160 can use one load cell or a set of load cells distributed at various points. The detected weight change when an ingredient container 112 is inserted will include at least part of the weight of the ingredient dispensing unit 110 and the ingredients. In one variation, the weight of the ingredient dispenser unit 110 will be consistent across the ingredient dispensing units 110 and so it can be subtracted from the total weight, yielding the ingredient weight as shown in FIG. 10. In alternative implementations with a variety of ingredient dispensing units 110, the variety of ingredient dispensing unit can be identified through an automatic or manual process. In one variation, the user inputs the variety through a connected app or through a control interface on the device. In another variation, RFID tags, optical scanners, or other digital identification techniques may be used to automatically identify the variety. A weight of an empty ingredient dispensing unit is stored for each variation and used in deducing the ingredient weight.

Figure 11:
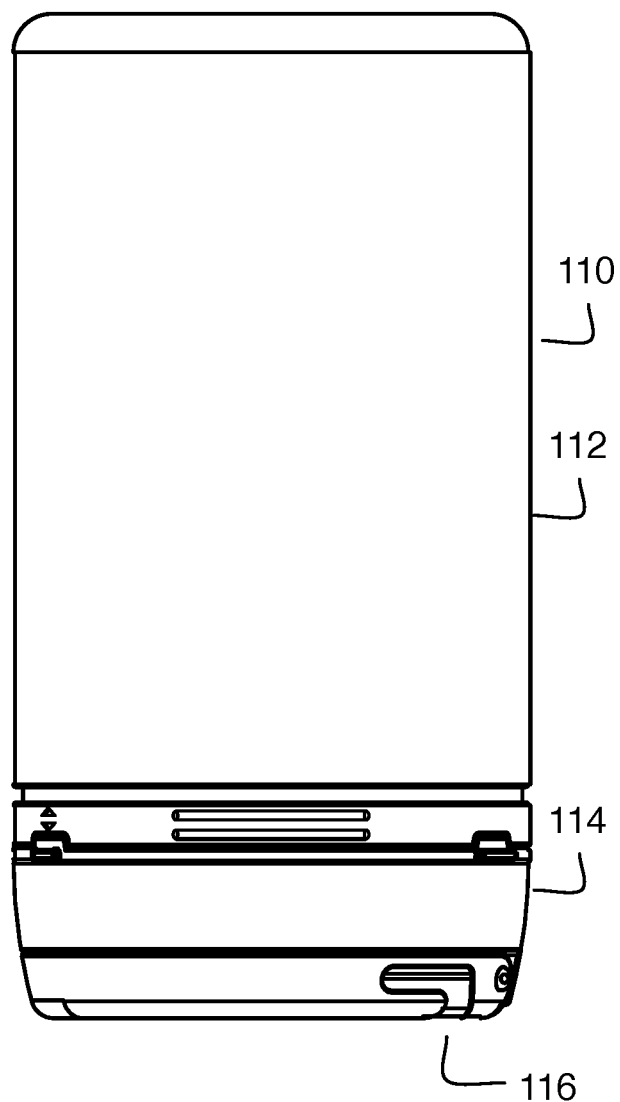
FIG. 11 is a schematic representation of a locking mechanism of a first variation of an ingredient dispenser unit.

In one variation shown in FIG. 8, the ingredient container 112 and the dispensing gate 114 are two distinct parts that engage through a first threaded fastener on each of the two parts. The dispensing gate 114 part can be screwed onto the ingredient container 112 as a form of a lid. The dispensing gate 114 part can include a second screwable coupling mechanism on the opposing end of the dispensing gate 114 part, which is used in attaching the ingredient dispenser unit 110 to the base of multi-ingredient dispenser 100. In the variation, where the dispensing gate 114 and the ingredient container 112 screw together and then the dispensing gate 114 screws into the dispenser base 150, a locking mechanism can be engaged to prevent the dispensing gate 114 from unscrewing from the ingredient container 112 when screwing into the dispenser base 150. The locking mechanism can be a ring mechanically coupled to the ingredient container 112 and restrained to a limited range of motion along the central axis of the container. The locking mechanism can include a mechanical keying element that engages with the dispensing gate 114 when the ingredient container 112 is inverted while inserting it into the multi-ingredient dispenser 100. When engaged, the locking mechanism prevents the dispensing gate 114 from unscrewing from the ingredient container 112. In one implementation, the locking mechanism can be a shiftable ring as shown in FIG. 11. For example, when a user has a basic ingredient container 112 standing on its base for loading ingredients, the locking mechanism rests in a position that does not mechanically interfere with the adding or removing of the lid component (e.g., the dispensing gate 114 portion). However, when the lid component is added and the ingredient container 112 is inverted (e.g., to be inserted into the dispenser base 150), the locking mechanism falls into a position that prevents independent rotation of the lid component and the ingredient container 112.

Figure 12:
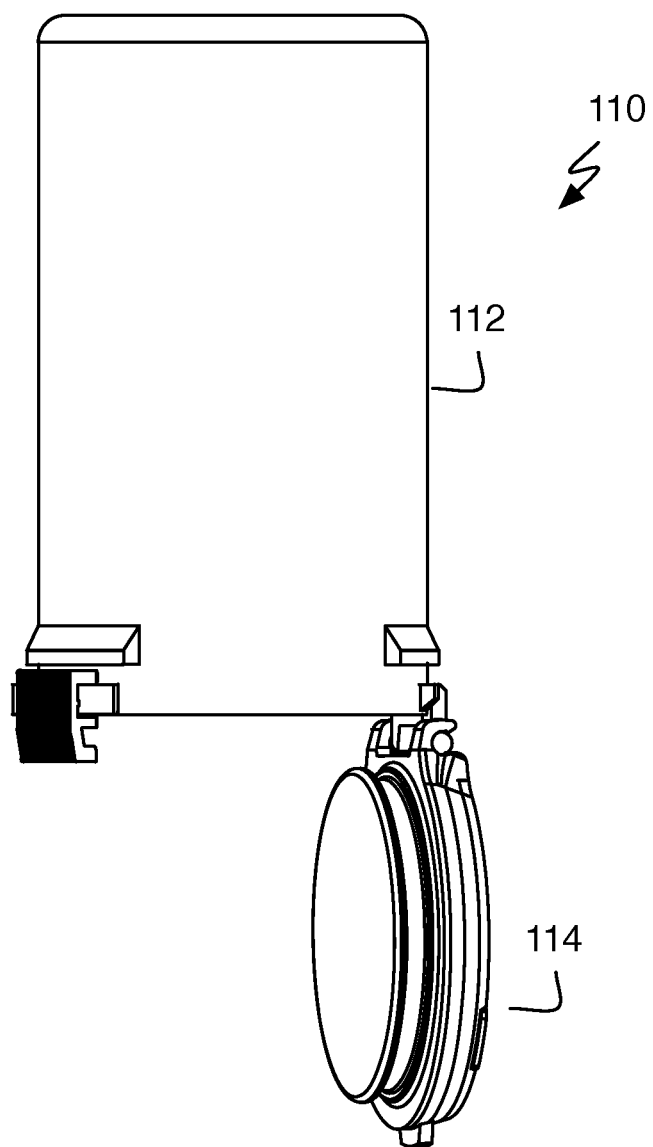
FIG. 12 is a schematic representation of a second variation of an ingredient dispenser unit.

In a second variation shown in FIGS. 12 and 13, the ingredient container 112 and the dispensing gate 114 are two distinct parts that engage at detachable hinge joint. The detachable hinge joint includes a pin portion and a hinge knuckle. The hinge knuckle is preferably a partially enveloping knuckle, which functions to enable the dispensing gate 114 to be removably attached to the ingredient container 112. Preferably, the pin portion is part of the ingredient container 112 and the hinge knuckle portion part of the dispensing gate 114. But such hinge components may be swapped or mixed between the two the ingredient container 112 and dispensing gate 114. The ingredient container 112 could additionally include a slidable latch that can mechanically restrict rotation of the dispensing gate 114 when engaged as shown in FIGS. 13A-13C. The slidable latch can move along a guide structure and includes a feature that engages with the dispensing gate. The slidable latch when in a first open state allows the dispensing gate 114 to open and close as shown in FIGS. 13A and 13B. The slidable latch in a second locked state restricts opening of the dispensing gate as shown in FIG. 13C. When the ingredient dispensing unit 110 is not engaged, the slidable latch can keep the dispensing gate 114 closed. The slidable latch is preferably disengaged and unlocked when inserted into the dispenser base. For example, an ingredient dispensing unit 110 is preferably inserted into a base receptacle and then rotated. Rotating preferably disengages the slidable latch and simultaneously engages a pin of the dispensing selector 120 with a pin coupler of the dispensing gate 114. The slidable latch may also be configured so that it is embedded within the dispensing gate and spring loaded in the closed position. If the dispensing gate is open for loading ingredients by the user, when closing the dispensing gate, the latch will spring back until it clears the ingredient container and will then spring forward into a latch hole or groove within the ingredient container.

The ingredient container 112 and the dispensing gate 114 can couple through any suitable mechanical coupling mechanism such as a latch or a spring-loaded pin. Additionally, the dispensing gate 114 and the ingredient container 112 may be integrated with alternative approaches. In some variations, the ingredient container 112 and the dispensing gate 114 are part of the same unit. For example, an ingredient dispenser unit 110 for pasta may include a defined cavity that exposes one end opposite of the integrated dispensing gate 114. Similarly, there could be alternative arrangements and divisions of parts. For example, the dispensing gate 114 and the ingredient container 112 could be a substantially solitary component wherein there could be any number of parts contributing to the solitary component. In this variation, the dispensing gate 114 can act as the base or bottom of the dispenser unit, and a lid on the opposite end could be opened and closed (e.g., attached or removed) in order to insert the said ingredients into the dispenser unit.

The above variations of ingredient containers 112 are described as being a temporary ingredient storage solution until it is time to dispense the ingredients. Some alternative embodiments may enable alternative components to be added to the multi-ingredient dispenser 100 in place of an ingredient dispenser unit 110, where the primary objective of the alternative component can be something other than temporary ingredient storage. In one variation, a cap component could be coupled to a base receptacle. A cap container can function as a lid when ingredients do not need to be used. The cap container can be a basic solid component that covers the base receptacle during the cooking process. Alternatively, an empty ingredient container 112 may be used as a lid. Other alternative components could include a mixing component, wherein in place of a mixer unit integrated with the cooking apparatus, the mixing component could be attached to a base receptacle and extend into a cooking apparatus and provide controlled mixing or agitation during the cooking process. A mixing component may enable the multi-ingredient dispenser to be used with traditional cooking apparatuses. Similarly, a heating component could similarly be attached at a base receptacle and extend into a cooking apparatus to heat the contents of the cooking apparatus. Other alternative types of components could similarly be selectively added to a multi-ingredient dispenser 100.

2.4 Dispensing Selector

The dispensing selector 120 functions to transition an ingredient dispenser unit 110 into an open state. The dispensing selector 120 is preferably controlled by the control unit 140. The dispensing selector 120 individually controls the open state of each of the set of ingredient dispenser units 110. In a preferred implementation, there is a set sequential order to activating the ingredient dispenser units 110. The sequential order could be inherent in the design of the activating mechanism such as in the guided pin mechanism described below. However, the dispensing selector 120 may be enabled to activate the set of ingredient dispenser units 110 in any order with any suitable timing. The dispensing selector 120 may additionally transition an ingredient dispenser unit 110 to a closed state. In the case of a variable valve, the dispensing selector 120 may control the degree to which a valve is opened for the ingredient dispenser unit 110.

In a first variation, the dispensing selector 120 uses a guided pin mechanism. The guided pin mechanism uses a pin that engages with an ingredient container 112 unit, and then the position of the pin is controlled via a motor so as to be able to open or close the door by repositioning the pin. The guided pin mechanism can be integrated into the dispenser base 150. The guided pin mechanism can include a central rotating hub 122 with a hub pin guide rail 124 along the outside wall of the rotating hub 122 and a pin positionally guided by at least the hub pin guide rail 124. Additionally, the dispensing gate 114 can include a pin coupler that is designed to engage with the pin when the ingredient dispenser unit 110 is inserted/engaged.

Figure 14:
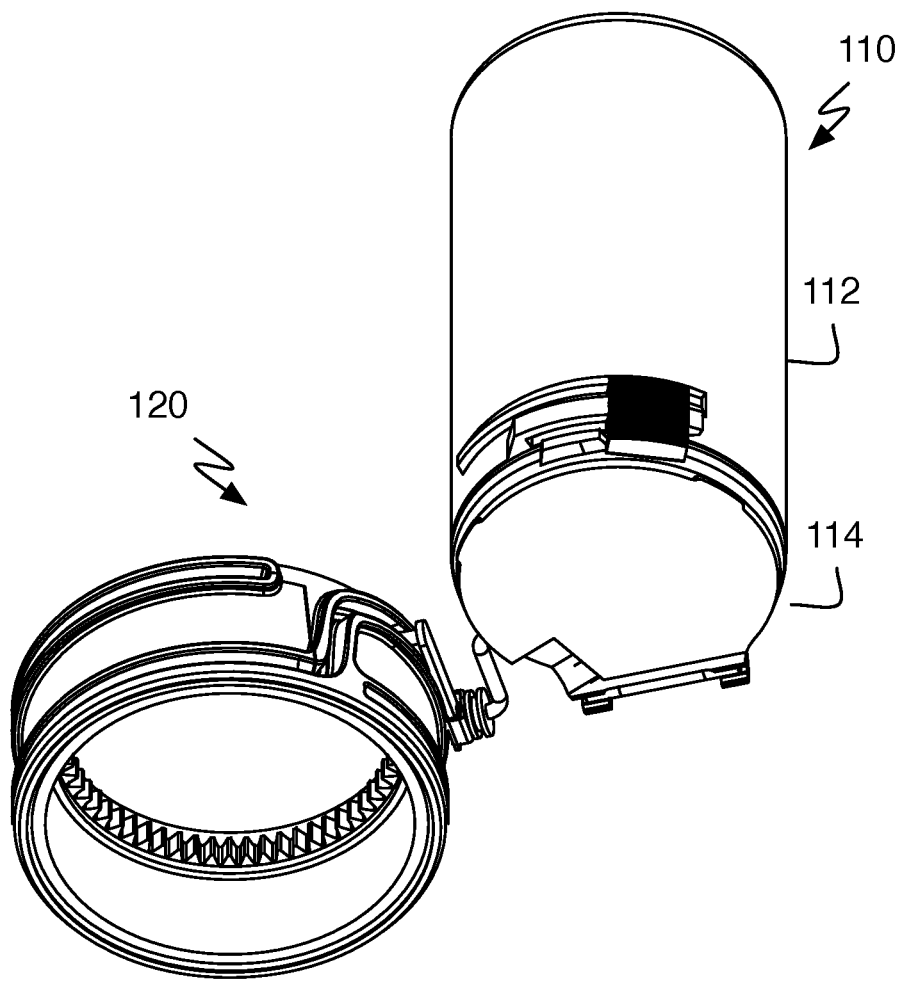
FIG. 14 is a schematic representation of a single sided pin variation of a guided pin mechanism.

In one variation, the guided pin mechanism is a single sided pin variation as shown in FIG. 14. A single sided pin variation preferably uses a pin rotationally mounted at one point with a first lever mechanically coupled to the hub guide rail 124 and a second lever with a pin that can mechanically couple with the pin coupler of a dispensing gate 114. The translation of first lever translates into rotation of the second lever and the pin. The dispenser base could include a guard wall that separates the first lever and the second lever. The guard wall can function as a shield from food debris. The set of pins 128 can extend from the hub 122 be in a spoke formation around the hub 122, with one pin for each ingredient dispenser unit cavity. The pin preferably engages with the dispensing gate 114 of an inserted ingredient container 112 unit. The pin additionally has position enforced by the hub guide rails 124.

Figure 15:
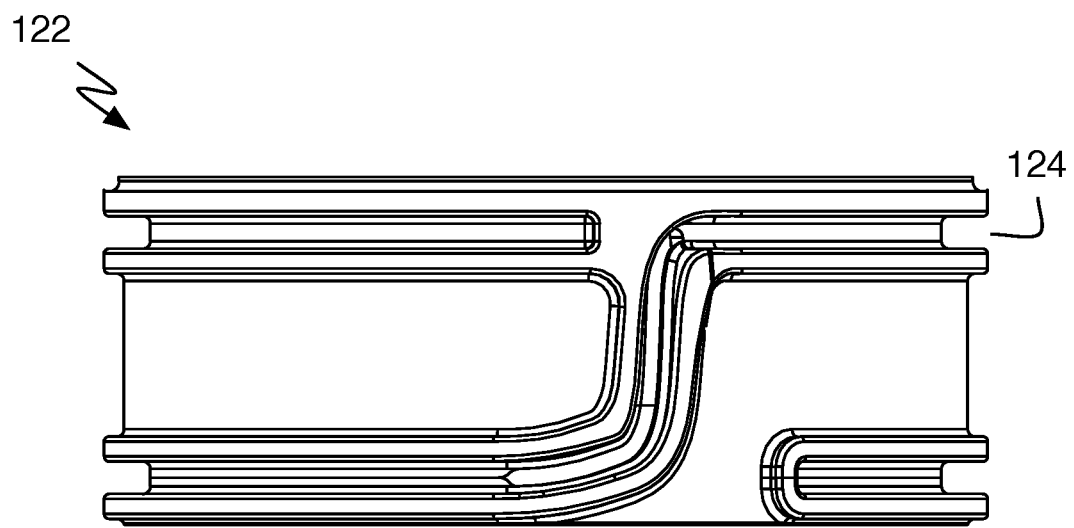
FIG. 15 is a schematic representation of a hub and hub guide rail.
Figure 16:
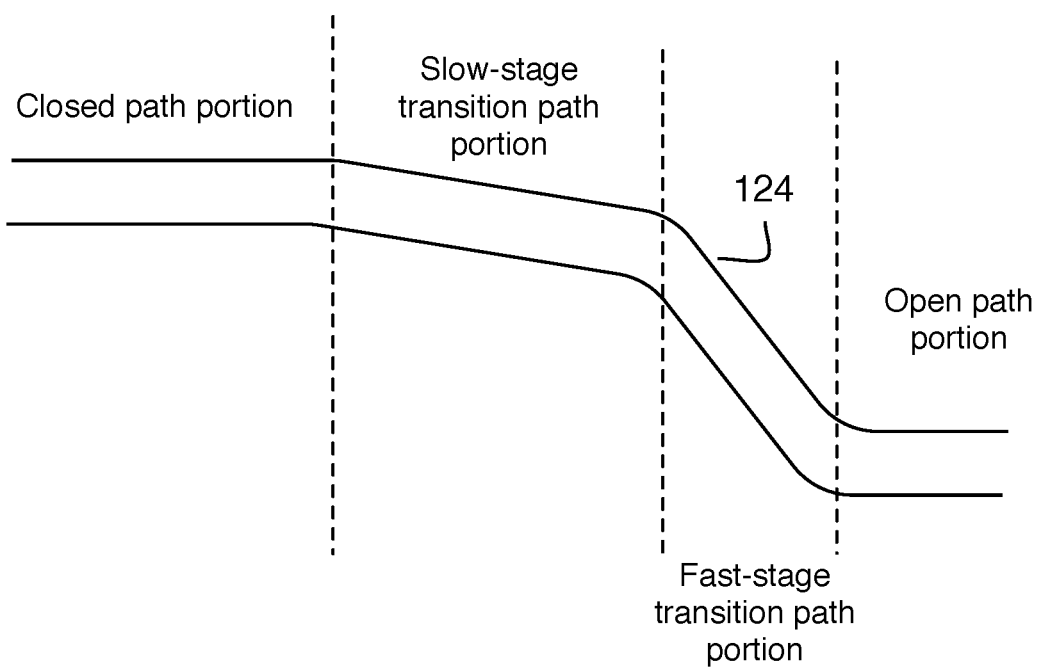
FIG. 16 is a diagram representation of a hub guide rail with a multiple stages to the transition path portion.

The hub guide rail 124 defines a cavity path wherein the cavity path has a closed path portion at a first height of the hub 122, an open path portion at a second height of the hub 122, and a transition path portion that connects the open and closed path portions in a substantially continuous manner as shown in FIG. 15. The open path and the closed path portions circumscribe a substantial portion of the hub 122 without forming a continuous ring. When a pin is in the closed path portion, an ingredient container 112 unit is in a closed state. When a pin is in the open path portion, an ingredient container 112 unit is in an open state. The open path portion can be at a lower height than the closed path. When a pin enters the transition path portion, the pin is moved so as to transition the ingredient container 112 unit from one state to another. Additionally, the transition path portion can include variable stages of transition. The path of the guide rail and the rate at which it transitions to between the open path portion and the closed path portion can alter the forces applied to pin engaged with the dispensing gate 114. There is preferably a slow stage of the transition path that is characterized by a first slope (e.g., a gradual slope) and a fast stage of the transition path that is characterized by a second slope (e.g., a fast slope). The first slope is preferably less than the second slope as shown in FIG. 16. The slow stage is preferably adjacent to the closed path portion, and functions to apply more force used in opening the dispensing gate. The slow stage then transitions to a fast stage, which is adjacent to the open path portion. The fast stage functions to readily open the dispensing gate once it is initially cracked open and less force is needed.

Figure 17:
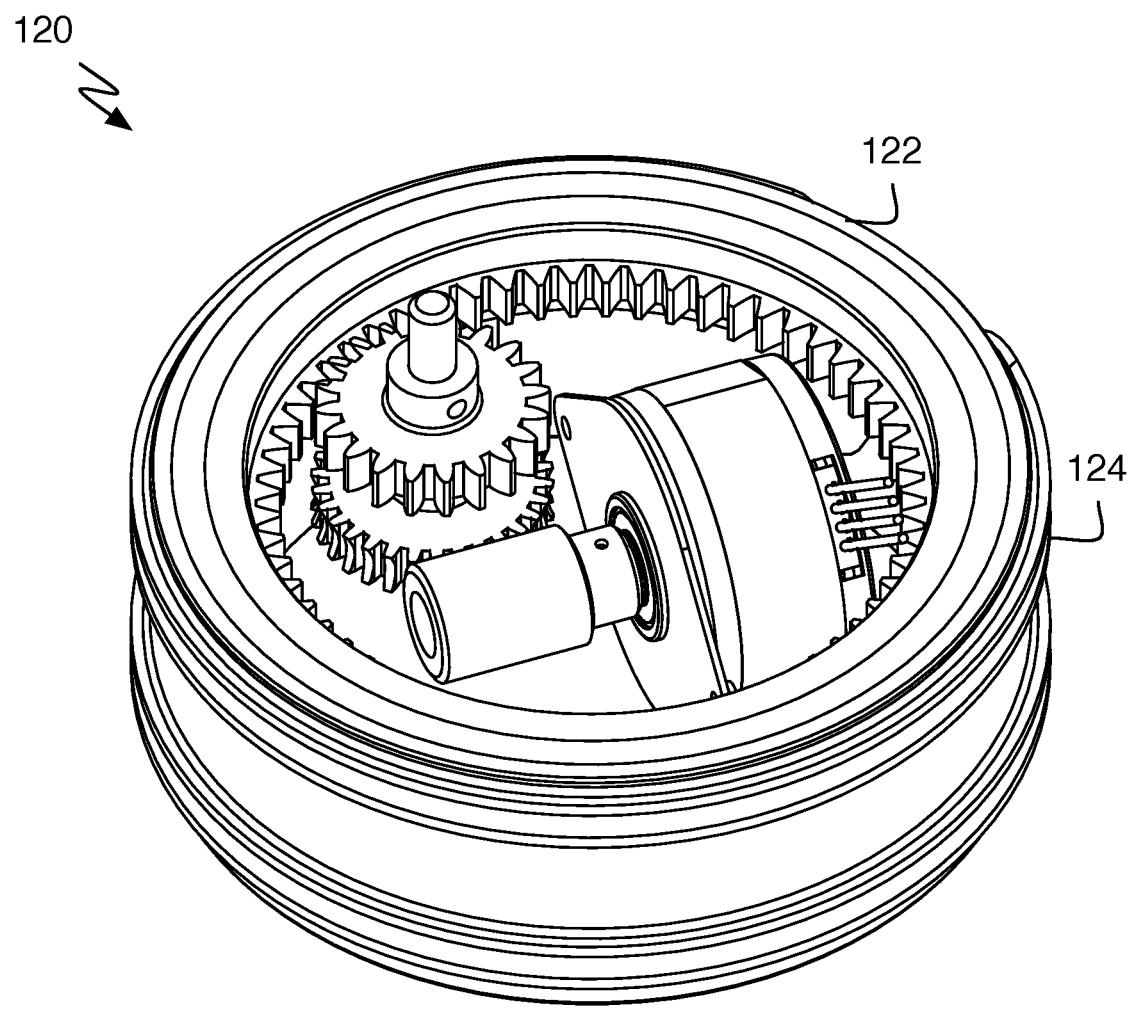
FIG. 17 is a schematic representation of a hub motor system.
Figure 18:
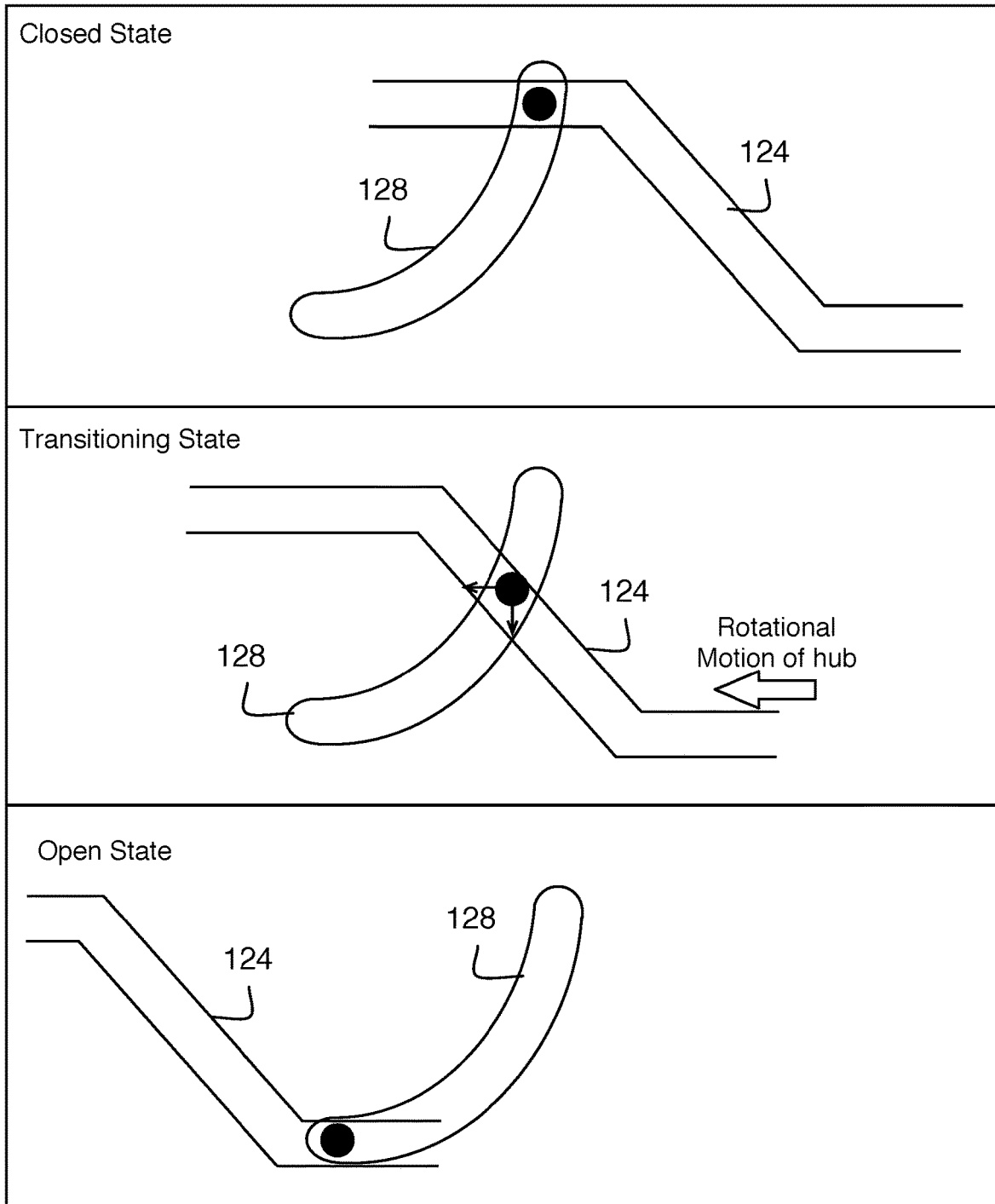
FIG. 18 is a schematic representation illustrating the interaction of the hub guide rail and the complementary guide rail on the pin in an opening transition.

The pin guide rail of the hub 122 is preferably shared by all pins of the ingredient container 112 units. A first side of a pin will rest in the hub guide rail 124. A geared motor system can be designed to rotate the hub 122 as shown in FIG. 17. The geared motor system preferably uses a system of gears to translate motor driven rotation into rotation of the hub 122. The hub 122 can alternatively be driven directly from a motor.

In an alternative variation, the guided pin mechanism could be a two sided pin variation, wherein the pin transverses the dispensing gate 114 where two ends of a pin are guided by a pair of guide rails: the hub guide rail 124 and an additional complementary guide rail 128. The set of pins 129 can be in a spoke formation around the hub 122, with one pin for each ingredient dispenser unit cavity. The pin preferably engages with the dispensing gate 114 of an inserted ingredient container 112 unit. The pin additionally has position enforced by the hub 122 and the complementary guide rails 128. The hub guide rail 124 guides one end of the pin along a path that opens or closes the dispensing gate 114.

Figure 19:
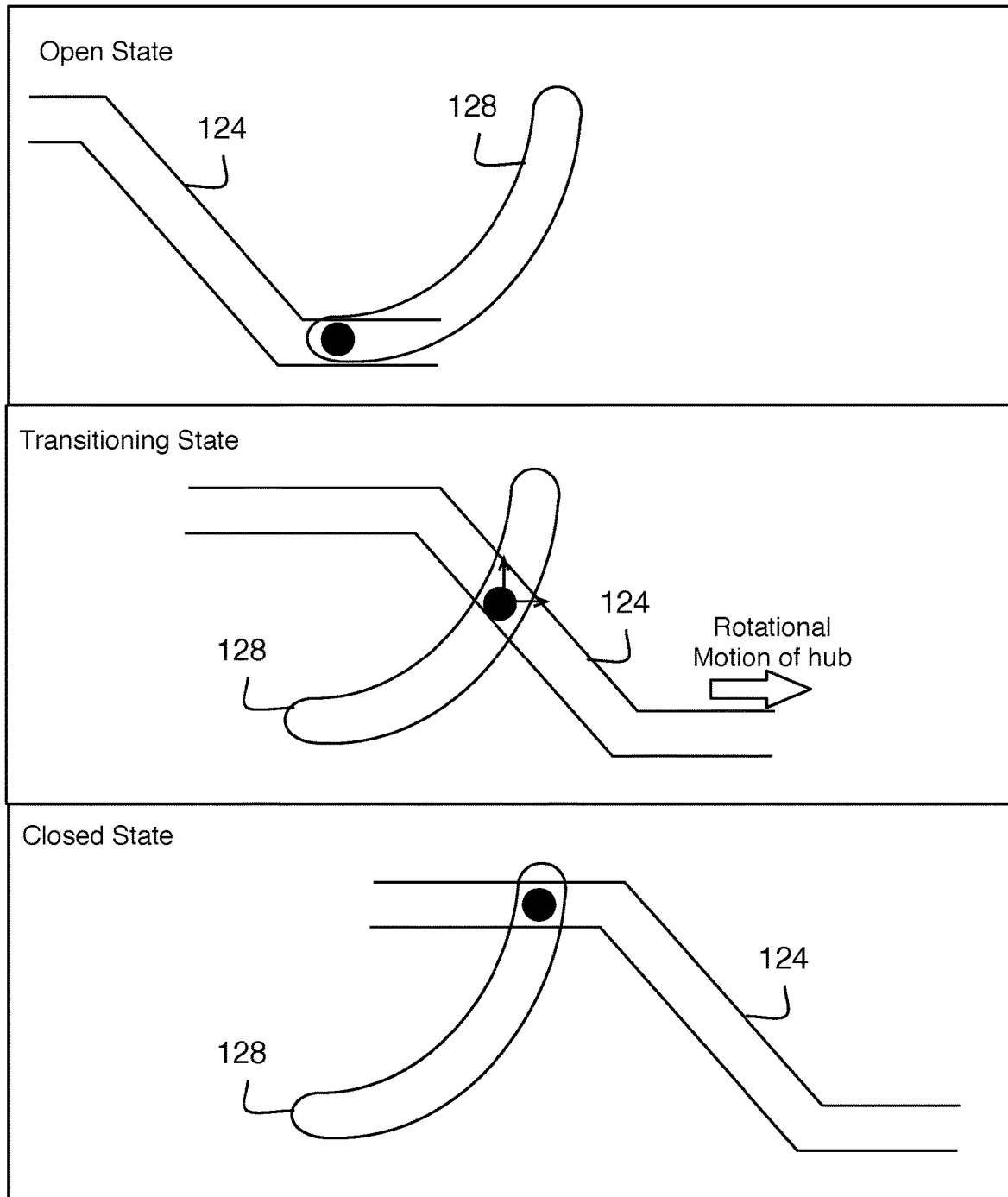
FIG. 19 is a schematic representation illustrating the interaction of the hub guide rail and the complementary guide rail on the pin in a closing transition
Figure 20A:
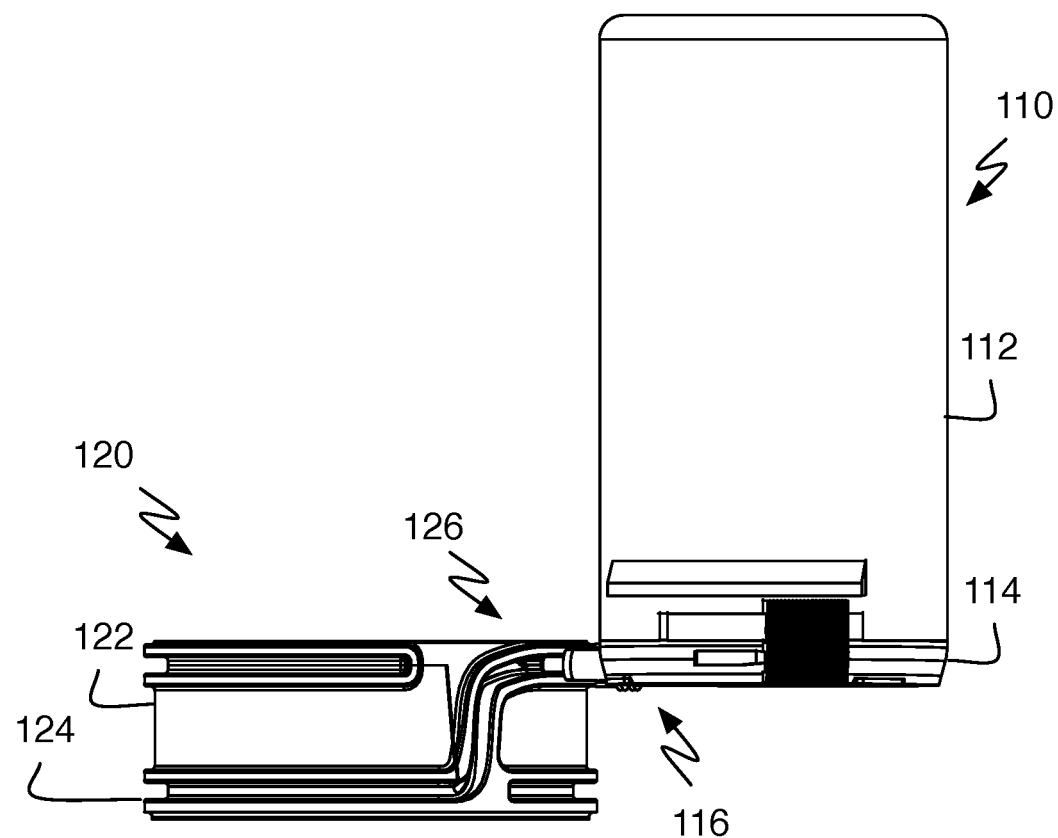
FIGS. 20-20C are detailed schematic representations of the interaction of the hub guide rail and the complementary guide rail on the pin.
Figure 20B:
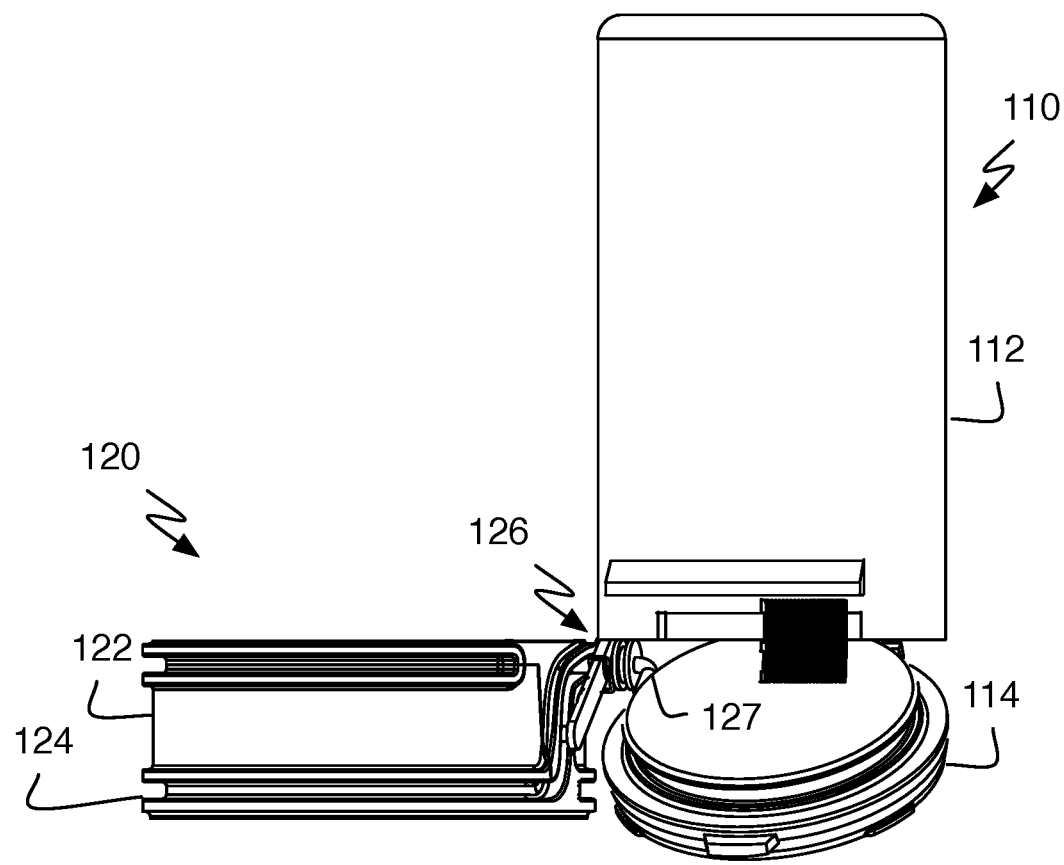
Figure 20C:
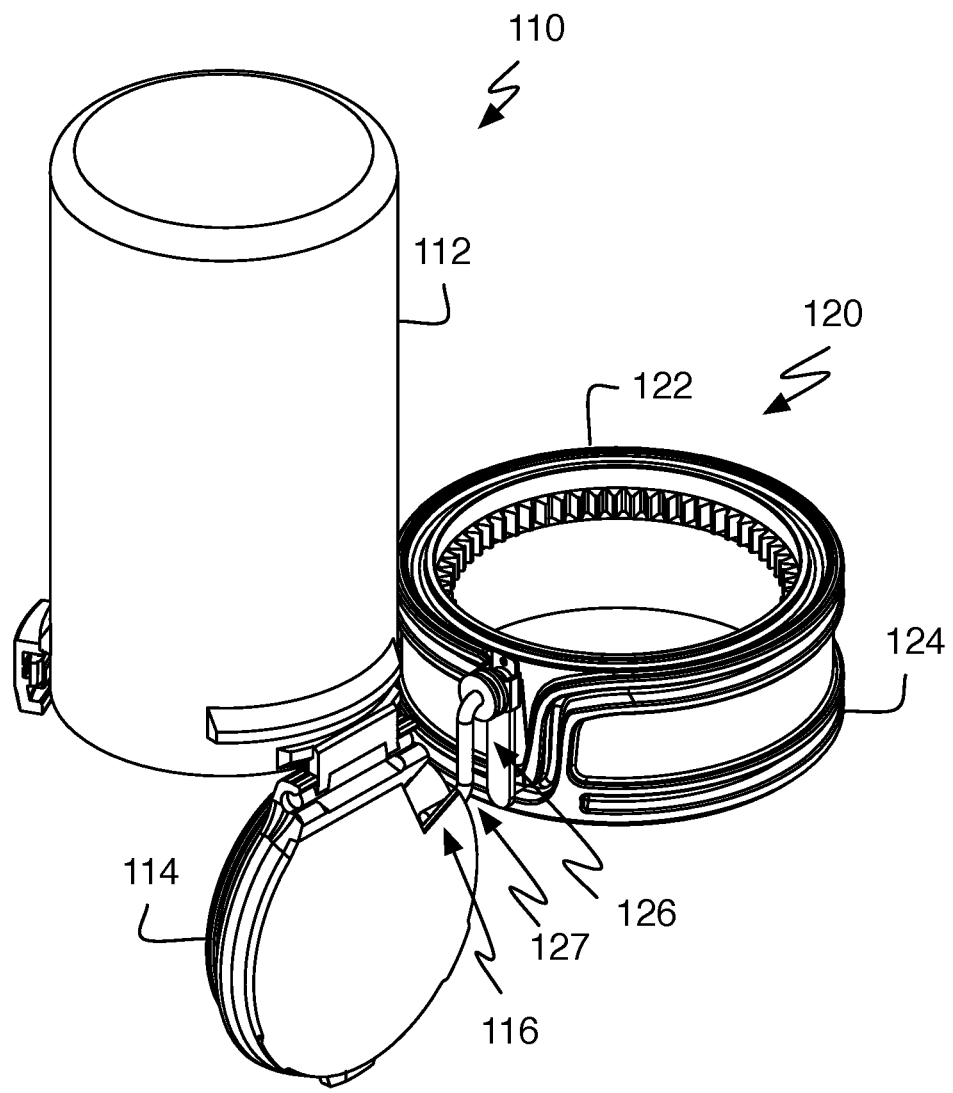

In the two-sided pin variation, the second side of each pin will reside in a distinct complementary guide rail 128. The complementary guide rail 128 is defined by a cavity path on the wall of a base receptacle or an alternative portion of the dispensing base 150, wherein the position of the second guide rail is opposing the hub 122. The complementary guide rail 128 preferably forms an arc in a direction opposing to the direction of the transition portion of the path. The transition portion of the hub guide rail 124 primarily applies force on the pin with the hinged lid providing a rotational restraint. The interaction of the actuation of the hub 122, the hub guide rail 124, the pin, and the dispensing gate 114 can open and close the gate of an ingredient dispensing unit 110. The interaction of the hub guide rail 124 and the pin preferably results in the pin being moved from a closed position through an arcing path to an open position as shown in FIG. 18 and FIGS. 20A-20C. When the hub 122 is rotated in the opposite direction, the interaction results in a closing of gate by moving the pin in a reverse arcing motion as shown in FIG. 19.

When in a closed path the pin is preferably aligned to bisect the defined opening of the ingredient container 112 unit cavity in the base. The central axis of the pin preferably maintains directionality when traversing between a closed and open state (i.e., the central axis of the pin in one state is substantially parallel to the central axis of the pin in any other state).

Figure 21:
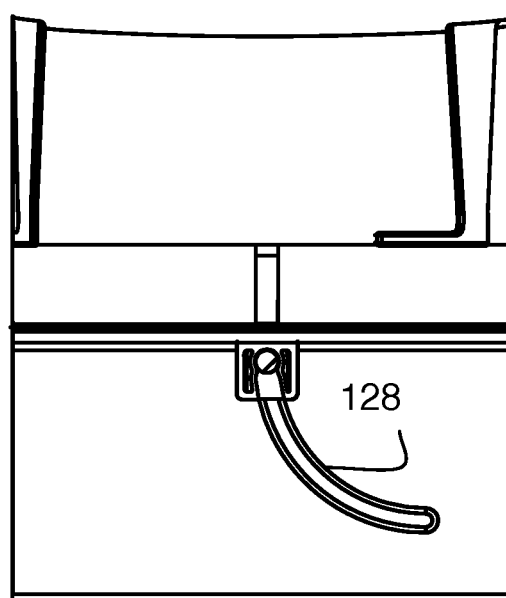
FIG. 21 is a schematic representation of an exemplary fixture mechanism.

The end of the complementary path associated with the closed position can include a fixture mechanism. The fixture mechanism is preferably a pressure snap to stabilize the position of the pin when in the closed position as shown in FIG. 21. The fixture mechanism could alternatively be magnets, controlled gate, or any suitable mechanism.

In an alternative variation, the dispensing selector 120 could interface with the dispensing gate 114 through electromagnetically controlled latching mechanisms. The gate of the dispensing gate 114 could be held in a closed position through passive magnets. When the control unit 140 signals to open an id dispenser unit 110, the dispensing selector 120 could activate an electromagnet to force the gate of the dispensing gate 114 open. The dispensing selector 120 and the dispensing gate 114 can use any suitable cooperative mechanism to open and close the gate.

2.5 Control Unit

The control unit 140 functions to manage the control logic of the system. The control unit 140 is preferably operative at least in part on a computing device. In one variation, the control unit 140 can communicate with a remote second computing unit such as a smart phone, tablet, or a network accessible server. The control unit 140 can include user input elements such as a touch screen, buttons, dials, switches, and/or any suitable user interface elements. Alternatively, user interface elements of the second computing unit may be used. As a primary task, the control unit 140 is in communication with the various active components and sensors of the system, and the control unit 140 directs actions of the active components. When cooking a dish, the control unit 140 directs the dispensing selector 120 on when to open (and/or close) an ingredient dispenser unit 110, when to mix the food, when to heat the food, and/or any suitable aspect. Preferably, a user interface guides the user interaction with the device. For example, an app could guide a user on adding ingredients to ingredient containers 112, how to add the ingredient containers 112 to the dispenser base 150, and showing the cooking process. The system could alternatively include a display and/or speaker to provide a user interface directly from the system. The display can be a flexible LED display, an LCD display, or any suitable type of display. The control unit 140 can additionally control additional elements such as a heating unit 300, mixing unit 400, and/or any suitable element of the system.

3. Additional Elements

The system can additionally include a cooking vessel 200, mixing unit 400, and/or a heating unit 300. Alternatively, the system can be used to communicate with an outside mixing unit 400, a heating unit 300, sensors, and/or other active cooking items.

In an integrated variation, the cooking apparatus is an integrated system that includes the cooking vessel 200, a mixing unit 400, and a heating unit 300. The mixing unit 400 and the heating unit 300 are preferably integrated into the cooking vessel. The heating unit 300 can be integrated into the base of the cooking vessel 200, and the mixing unit 400 can be a centrally located fixture inside the cooking vessel 200.

As described above, the cooking vessel 200 is preferably a pot, skillet, pan, pressure cooker, or other suitable container for use with cooking food. The cooking vessel 200 will include a defined chamber wherein ingredients are added. The cooking vessel can additionally include a top lip that may be used to engage with the multi-ingredient dispenser 100, but the multi-ingredient dispenser 100 may alternatively be positioned above the cooking vessel 200 in any suitable manner.

Figure 22:
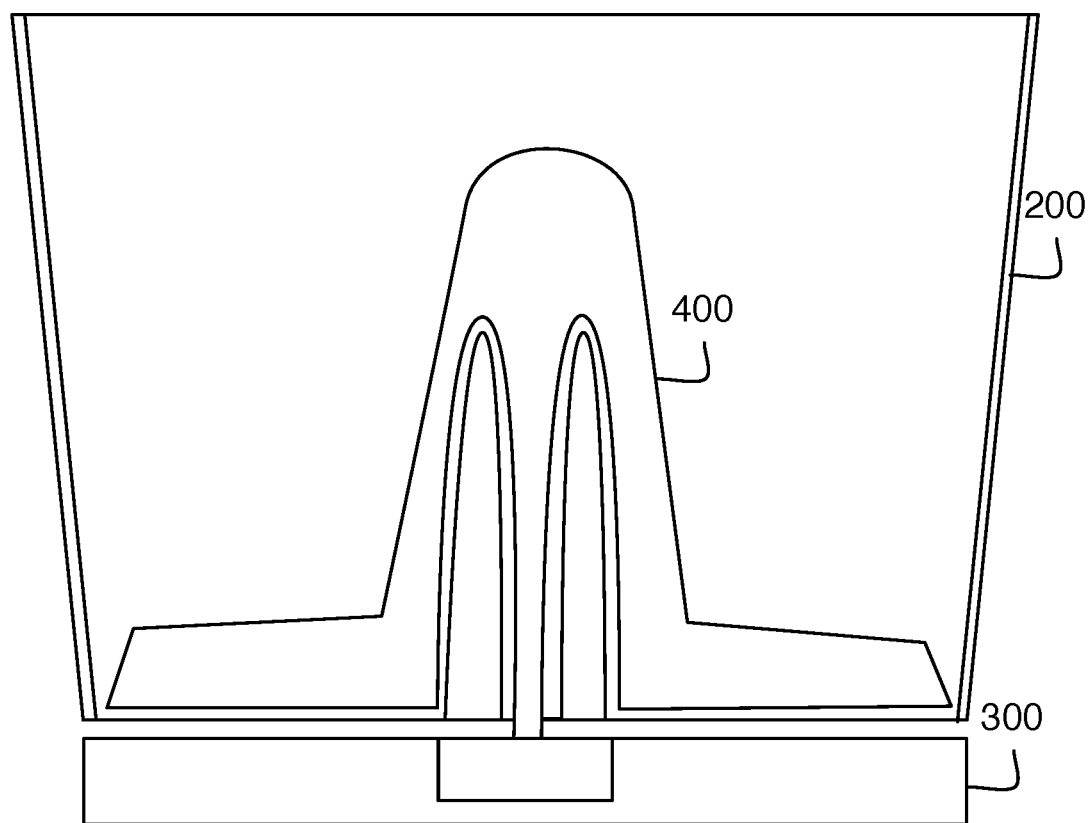
FIG. 22 is a cross-sectional view of a cooking vessel, a mixing unit, and a heating unit.

In one variation, the mixing unit 400 includes a mixer access port, a mixing motor and a mixing handle that couples to the mixer access port. For example, the cooking vessel 200 can include a mixer access port that extends upwards from the center of the bottom cooking surface in the cooking vessel 200. A user can insert a mixing handle onto the mixer access port, and the mixing handle can engage with the mixing motor through the mixer access port as shown in FIG. 22. In another variation, the mixing unit 400 can be a suspended mixing handle from the multi-ingredient dispenser 100, which functions to enable the multi-ingredient dispenser 100 to also provide mixing capabilities with a variety of devices. As described above, a set of different mixing handles could be provided to offer different mixing capabilities and to accommodate different cooking vessels 200.

The heating unit 300 can be any suitable type of heating unit 300 such as an electric stovetop, an induction stove top, a gas stove top, an electric grill, or any suitable heating unit 300. The heating unit 300 in an integrated variation is directly integrated into the cooking vessel 200. In distributed variation, an outside heating unit 300 may be controlled remotely. For example, a network accessible stove or cooking device could allow the system to control heating while using the outside cooking device. In the distributed variation, the system may be used to cook ingredients in a traditional cooking vessel.

Figure 23:
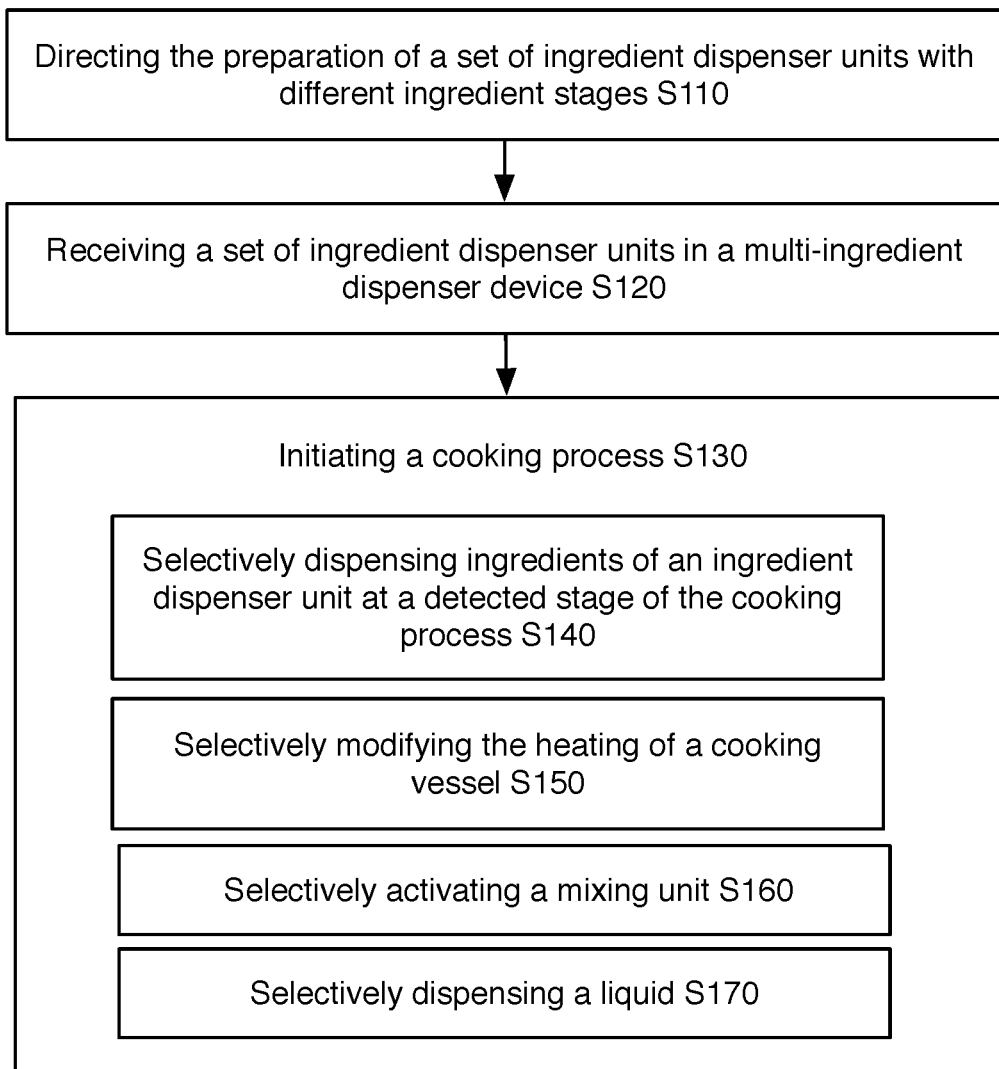
FIG. 23 is a flowchart representation of a method of a preferred embodiment.

The cooking apparatus of the system can be customized for any suitable type of cooking. Herein, stove-top cooking is used as the primary example. However, the system could be customized to be an automated slow cooker with staged ingredients, a pressure cooker, a steam cooker device, a sous-vide cooker, and/or any suitable type of cooking device. A pressure cooker can include seals to enable the multi-ingredient dispenser 100 to act as a pressurized lid. The pressure seal may additionally be dynamically controlled by the control unit 140. Other suitable permutations of a cooking apparatus may alternatively be used with the system 4. Method of Use An automated cooking system, such as the one described above can be used in the cooking of various dishes using a variety of cooking techniques. As shown in FIG. 23, a method for automating cooking with a multi-ingredient dispensing unit can include receiving a set of ingredient dispenser units in a multi-ingredient dispenser device S120, initiating a cooking process S130, which includes selectively dispensing ingredients of an ingredient dispenser unit at a detected stage of the cooking process S140. Preferably, a user can be guided in the preparation of ingredients and the automated cooking system. Accordingly, the method may additionally include directing the preparation of a set of ingredient dispenser units with different ingredient stages S110. The cooking process initiated in S130 can additionally include selectively modifying the heating of a cooking vessel S150, selectively activating a mixing unit S160, and/or selectively dispensing a liquid S170. The user may prepare ingredients and add them to the containers, but then can leave the cooking process to the cooking unit. The staged adding of ingredients, the cooker temperature changes, and the stirring can all be facilitated through the system.

The system is preferably implemented with a system substantially similar to the one above, but may alternatively be used with any suitable automated cooking system. Preferably, the automated cooking system of the method can include a multi-ingredient dispenser device, wherein at least two stages of ingredients are dispensed into a cooking apparatus. In particular, the method may be performed with an automated cooking system with a multi-ingredient dispenser device that utilizes a centralized dispensing selector.

Block S110, which includes directing the preparation of a set of ingredient dispenser units with different ingredient stages, functions to coordinate ingredient loading in a multi-ingredient dispenser device. A variety of dishes may be made through this process and so the preparation directions can be changed according to a selected cooking process. Directing the preparation can include rendering or delivering instructions through a user interface. The user interface could be text-based, graphical, audio, video, or use any suitable medium. The user interface could be provided through a secondary device such as a smart phone, a tablet, a website, a wearable, a personal assistant device, and/or any suitable secondary device. The user interface could alternatively be part of the automated cooking device of the multi-ingredient dispenser device. Directing the preparation of a set of ingredient dispenser units can include specifying user pre-preparation of ingredients such as cutting, dicing, peeling, measuring, and the like. Directing the preparation additionally directs a user to add a set of ingredients into an ingredient dispenser unit and how to load the ingredient dispenser unit in the multi-ingredient dispenser device as part of block S120. For example, a cooking process may include seven stages of ingredient additions (e.g., six ingredient dispenser units and a liquid dispenser). The ingredient preparation can include measuring the ingredients and doing any prep-work; then grouping the ingredients appropriately in seven different containers, and finally the order or placement for the ingredient dispenser units. In one implementation, the ingredient dispenser units are directed to be added in specific locations on the cooking device. In another implementation, the user can insert the ingredient dispenser units in any suitable location. The user may be directed to add the ingredient dispenser units in a specific order so that the cooking device can determine the ingredient contents of each ingredient dispenser unit.

Block S120, which includes receiving a set of ingredient dispenser units in a multi-ingredient dispenser device, functions to fix in position various vessels holding ingredients. The set of ingredient dispenser units preferably includes one or more and may depend on the selected cooking process for the current usage instance. For example, one recipe may have three stages where ingredients are added, which may involve at least three ingredient dispenser units. However, a second recipe may have two stages where ingredients are added, which may involve only three ingredient dispenser units.

The ingredient dispenser units are preferably received in a sequenced pattern. In a first variation, the ingredient dispenser units are spatially placed in a sequenced pattern. For example, a first ingredient dispenser unit with a first set of ingredients is received in a first predetermined position, and a second ingredient dispenser unit with a second set of ingredients is received in a second predetermined location. In a second variation, the temporal order in which the ingredient dispenser units are received is sequentially organized. For example, ingredient dispenser unit with a first set of ingredients is received first, and then a second ingredient dispenser unit with a second set of ingredients is received second.

Receiving the set of ingredient dispenser units preferably includes mechanically coupling the ingredient dispenser unit to a dispenser selector of the multi-ingredient dispenser system. As described above, the ingredient dispenser unit can include a dispensing gate with a coupling mechanism. Mechanically coupling can establish a kinematic linkage between a portion of the ingredient dispenser unit and at least part of the ingredient dispenser system. Activation by the ingredient dispenser can be translated to transitioning an ingredient dispenser unit to an open state.

Alternatively, receiving the set of ingredient dispenser units may alternatively or additionally include conductively coupling, wherein an electrical circuit connection is established. In one variation, the ingredient dispenser units are controlled by the multi-ingredient dispenser system through electromagnetically controlled magnets.

Block S130, which includes initiating a cooking process, functions to process a set of cooking instructions. A cooking process can be initiated in response to a direct request. For example, the user may press a "start" button. The cooking process can alternatively be automatically initiated in response to detecting some condition such as a time condition or a user location condition. A cooking process may be characterized by a set of instructions and can include multiple steps, which may be simultaneous or non-synchronous steps. The cooking process for the automated cooking device can include a variety of processes such as adding ingredients, heating, adding liquids, stirring, notifying users, and/or performing other suitable processes. The various processes could be performed in any suitable order and any suitable number of times. The various processes are preferably performed automatically. Accordingly, initiating a cooking process can include selectively dispensing ingredients of an ingredient dispenser unit at a detected stage of a recipe S140, selectively modifying the heating of a cooking vessel S150, selectively activating a mixing unit S160, and/or selectively dispensing a liquid S170.

Block S140, which includes selectively dispensing ingredients of an ingredient dispenser unit at a detected stage of a recipe, functions to add a stage of ingredients at a particular moment. Ingredients can be dispensed based on timing, temperature, and/or any suitable detected condition. An ingredient dispenser unit is preferably engaged or otherwise activated such that all or a portion of contained ingredients are dispensed. Preferably, a dispensing selector as described above is used. In a preferred implementation, selectively dispensing ingredients includes selectively activating an ingredient dispenser unit through centralized actuation. A single actuating source (e.g., motor) is used to selectively activate a set of ingredient dispenser units at appropriate times. Preferably, a guided pin mechanism can be driven by the single actuating source. A motor rotates a hub 122 that includes a guide rail. A pin component is kinematically linked to the guide rail and to a dispensing gate of an ingredient dispenser unit. As the hub 122 rotates, the pin is driven so as to transition the dispensing gate between a closed and open state. Centralized actuation may include sequential dispensing wherein the set of ingredient dispenser units are activated in a predefined sequence. The timing of when each is activated may be controlled, and is preferably controlled by controlling the degree of actuation. For example, a centralized actuator is turned on which will dispense ingredients from a first ingredient dispenser unit, then the centralized actuator can be stopped until it's time to dispense ingredients from a second ingredient dispenser unit.

In an alternative implementation, selectively dispensing ingredients includes selectively activating an ingredient dispenser unit through a distributed actuation mechanism. A distributed actuation mechanism can include a set of driven actuators used in dispensing ingredients from a subset of the ingredient dispenser units. In one variation, each of the ingredient dispenser units is coupled with an individually controlled electromagnetic driven actuator. The electromagnetic driven actuator is coupled to a dispensing gate of an ingredient dispenser unit. Each ingredient dispenser units can be individually controlled through an electrical signal. Alternatively, individual solenoids or motor systems may be used in the distributed actuation mechanism.

Block S150, which includes selectively modifying the heating of a cooking vessel, functions to adjust the cooking temperature. Heat can be modified based on timing, temperature, and/or any suitable detected condition. Heating can be adjusted to various temperatures. Modifying heating of a cooking vessel can include setting a heat setting to a first heating level and maintaining that heating level until changed. The heating level can be a magnitude value (e.g., high, medium, low, etc.). Alternatively, the heating level could be a temperature value. A temperature sensor preferably collects the temperature value and a heating unit is controlled to obtain and maintain that temperature value. In addition to modifying the heating to target particular levels, a heating transition profile could be performed. Wherein a transition profile can define the manner in which temperatures are changed. For example, a cooking process may involve slowly increasing heat for 5 minutes.

Block S160, which includes selectively activating a mixing unit, functions to stir the contents of a cooking vessel. The mixing unit can be activated based on timing, temperature, and/or any suitable detected condition. A mixing unit may be driven with various intensities and mixing patterns.

Block S170, which includes selectively dispensing a liquid, functions to add liquids to the cooking vessel at appropriate times. Liquid can be dispensed based on timing, temperature, and/or any suitable detected condition. Additionally or alternatively, liquid may be dispensed based on liquid level or steam detection. For example, a liquid sensor may detect that all the liquid in a cooking vessel has been boiled off and more liquid may be added. Liquid can be dispensed multiple times during a cooking process. Preferably, liquid can be added in substantially specified volumes.

The method can additionally include operating a cooking vessel cleaning mode. An automated cooking device could be set to perform a self-cleaning process. Operating a cooking vessel cleaning mode can include dispensing liquid, heating the liquid, and mixing the liquid. Additionally, a cleaning solution could be automatically dispensed.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. An automated cooking device comprising:
   a multi-ingredient dispenser that comprises a base and a dispensing selector, wherein the base comprises a set of base receptacles;
   a set of ingredient dispenser units configured to removably couple with the base receptacles and configured to controllably open when in an engaged mode with the dispensing selector of the multi-ingredient dispenser, wherein each ingredient dispenser unit is comprised of an ingredient container and a dispensing gate, wherein the dispensing gate includes a hinged door that can open and close, wherein the dispensing gate includes a coupling mechanism with a hook structure that is configured to engage with part of the dispensing selector,
   wherein an open state of each of the set of ingredient dispenser units is individually controllable by the dispensing selector; and
   a control unit that is a computing device comprising a user interface and that at least partially controls the dispensing selector and is configured to process a multi-stage cooking process,
   the dispensing selector comprising a guided pin mechanism comprises a central hub with a guide rail that promotes movement of a pin engaged with the coupling mechanism of the dispensing gate, wherein a geared motor system rotates the central hub to guide one end of the pin along the guide rail that opens or closes the dispensing gate.

2. The automated cooking device of claim 1, further comprising a cooking apparatus that comprises a cooking vessel with a heating unit; a mixing unit; and wherein the control unit at least partially controls the heating unit and the mixing unit.

3. The automated cooking device of claim 2, further comprising a liquid dispenser.

4. The automated cooking device of claim 2, wherein the base is removably connectable to the cooking apparatus at a vertical position at least partially above the cooking vessel; and wherein the multi-ingredient dispenser is horizontally aligned with the cooking apparatus.

5. The automated cooking device of claim 1, wherein the base of the multi-ingredient dispenser includes a set of coupling mechanisms that can couple with a variety of cooking vessels.

6. The automated cooking device of claim 1, further comprising the control interface to a remote heat control system.

7. The automated cooking device of claim 1, wherein the dispensing selector can sequentially open ingredient dispenser units in an engaged mode.

8. The automated cooking device of claim 1, the dispensing gate comprising the coupling mechanism that physically couples with the guided pin mechanism of the dispensing selector when the ingredient dispenser unit is in the engaged mode.

9. The automated cooking device of claim 8, wherein the guide rail includes an open path portion, a transition path portion, and a closed path portion.

10. The automated cooking device of claim 8, wherein the transition path portion comprises at least two stages.

11. The automated cooking device of claim 1, wherein the set of ingredient dispensing units includes at least one insulated ingredient dispensing unit, at least one sealed ingredient dispensing unit, at least one open-ended ingredient dispensing unit, at least one active ingredient dispensing unit, and at least one multi-chamber ingredient dispensing unit.

12. The automated cooking device of claim 1, further comprising a load cell system.

13. An automated cooking device comprising:
   a multi-ingredient dispenser that comprises:
      a base with a set of base receptacles;
      a set of ingredient dispenser units that removably couple with the base receptacles and controllably open when in an engaged mode with the multi-ingredient dispenser,
      wherein each ingredient dispenser unit is comprised of an ingredient container and a dispensing gate, wherein the dispensing gate includes a hinged door that can open and close, wherein the dispensing gate includes a coupling mechanism with a hook structure that is configured to engage with part of the dispensing selector, wherein an open state of each of the set of ingredient dispenser units is individually controllable by the dispensing selector;

a dispensing selector comprises a central rotating hub with a guide rail coupled to a set of pins at each of the base receptacles, wherein the set of pins mechanically engages with the dispensing gate of an ingredient dispenser unit when engaged, wherein the guide rail includes a profile with an open path portion, a transition path portion, and a closed path portion, wherein a geared motor system rotates the central hub to guide one end of the set of pins along the guide rail that opens or closes the dispensing gate; and a liquid dispenser;

a cooking apparatus that comprises a cooking vessel, a heating unit and a mixing unit;

a control unit that is a computing device comprising a user interface and that at least partially controls the dispensing selector, the heating unit, and the mixing unit, and wherein the control unit is configured to process a multi-stage cooking process;

wherein the base is removably connectable to the cooking apparatus at a vertical position at least partially above the cooking vessel; and wherein the multi-ingredient dispenser is horizontally aligned with the cooking apparatus.

14. The automated cooking device of claim 1, wherein each dispensing gate is attached onto the respective ingredient container as a form of a lid.

* * * * *